United States Patent
Sakazi et al.

(10) Patent No.: US 12,554,839 B2
(45) Date of Patent: Feb. 17, 2026

(54) APPLICATION DISCOVERY ENGINE IN A SECURITY MANAGEMENT SYSTEM

(71) Applicant: Microsoft Technology Licensing, LLC, Redmond, WA (US)

(72) Inventors: Shay Chriba Sakazi, Herzliya (IL); Fady Copty, Haifa (IL); Tamer Salman, Haifa (IL); Ofir Monza, Mishmar David (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 18/331,022

(22) Filed: Jun. 7, 2023

(65) Prior Publication Data

US 2024/0411867 A1    Dec. 12, 2024

(51) Int. Cl.
*G06F 21/55* (2013.01)

(52) U.S. Cl.
CPC ................... *G06F 21/552* (2013.01)

(58) Field of Classification Search
CPC ...... G06F 21/552; G06F 21/55; G06F 21/554; G06F 21/566; G06F 2221/03; G06F 21/577; H04L 63/1408; H04L 41/0654; H04L 41/145; H04L 41/22; H04L 43/06; H04L 63/10; H04L 63/1441; H04L 63/145; H04L 63/20; H04L 67/10; H04L 63/1425; H04L 63/1433; G06Q 10/0635; G06Q 30/018
See application file for complete search history.

(56) References Cited

U.S. PATENT DOCUMENTS 9,900,217 B2 *   2/2018   Gourlay ............... H04L 41/0873
10,182,496 B2 *  1/2019   Saxena ................ H04L 41/0806
(Continued)

OTHER PUBLICATIONS

Cloud_Property_Graph_Connecting_Cloud_Security_Assessments_with_Static_Code_Analysis, 2021, IEEE (Year: 2021).*

(Continued)

*Primary Examiner* — Philip J Chea
*Assistant Examiner* — Jasmine Mochen Day
(74) *Attorney, Agent, or Firm* — Shook, Hardy & Bacon L.L.P.

(57) ABSTRACT

Methods, systems, and computer storage media for providing data security posture management using an application discovery engine in a security management system. Application discovery supports identifying and mapping various applications within a computing environment. In particular, application discovery can be provided as part of security management operations to assess security posture of applications, identify vulnerabilities, and ensure compliance with regulations. In operation, application discovery data associated with a plurality computing resources of a computing environment is accessed. An annotated application discovery graph comprising a plurality of entities that represent the plurality of computing resources is generated. The annotated application discovery graph is deployed to support generating security postures for computing environments. A request is received for a security posture of the computing environment. A security posture visualization that includes an application discovery graph annotation is generated. The security posture visualization is communicated to cause display of the security posture visualization.

20 Claims, 18 Drawing Sheets

(56) References Cited

U.S. PATENT DOCUMENTS

| | | | | |
|---|---|---|---|---|
| 11,038,861 | B2* | 6/2021 | Agarwal | H04L 63/06 |
| 11,159,555 | B2* | 10/2021 | Hadar | H04L 63/1433 |
| 11,423,072 | B1* | 8/2022 | Chen | G06F 18/253 |
| 11,514,321 | B1* | 11/2022 | Chen | G06N 3/08 |
| 11,553,348 | B2* | 1/2023 | Wang | H04W 12/122 |
| 2019/0156041 | A1* | 5/2019 | Levy | G06F 21/577 |
| 2020/0177616 | A1* | 6/2020 | Hadar | H04L 63/1433 |
| 2021/0352099 | A1 | 11/2021 | Rogers | |
| 2022/0038491 | A1 | 2/2022 | Hadar | |
| 2022/0303295 | A1* | 9/2022 | Erlingsson | G06F 16/9038 |
| 2022/0335151 | A1 | 10/2022 | James Stephen | |
| 2023/0087054 | A1 | 3/2023 | Ithal | |

OTHER PUBLICATIONS

Abnormal flow detection method and device, electronic equipment and computer readable medium (Year: 2020).*

"Spanning Tree Protocol", Retrieved from the URL: https://en.wikipedia.org/w/index.php?title=Spanning_Tree_Protocol&oldid=957797233, May 20, 2020, 14 Pages.

International Search Report and Written Opinion received for PCT Application No. PCT/US2024/031523, Sep. 11, 2024, 17 pages.

Smit, Martijn, "Using Machine Learning to Discover Applications", Retrieved from: https://blogs.vmware.com/management/2020/05/using-machine-learning-to-discover-applications.html, May 27, 2020, 5 Pages.

International Preliminary Report on Patentability (Chapter I) received for PCT Application No. PCT/US2024/031523, mailed on Dec. 18, 2025, 11 Pages.

* cited by examiner

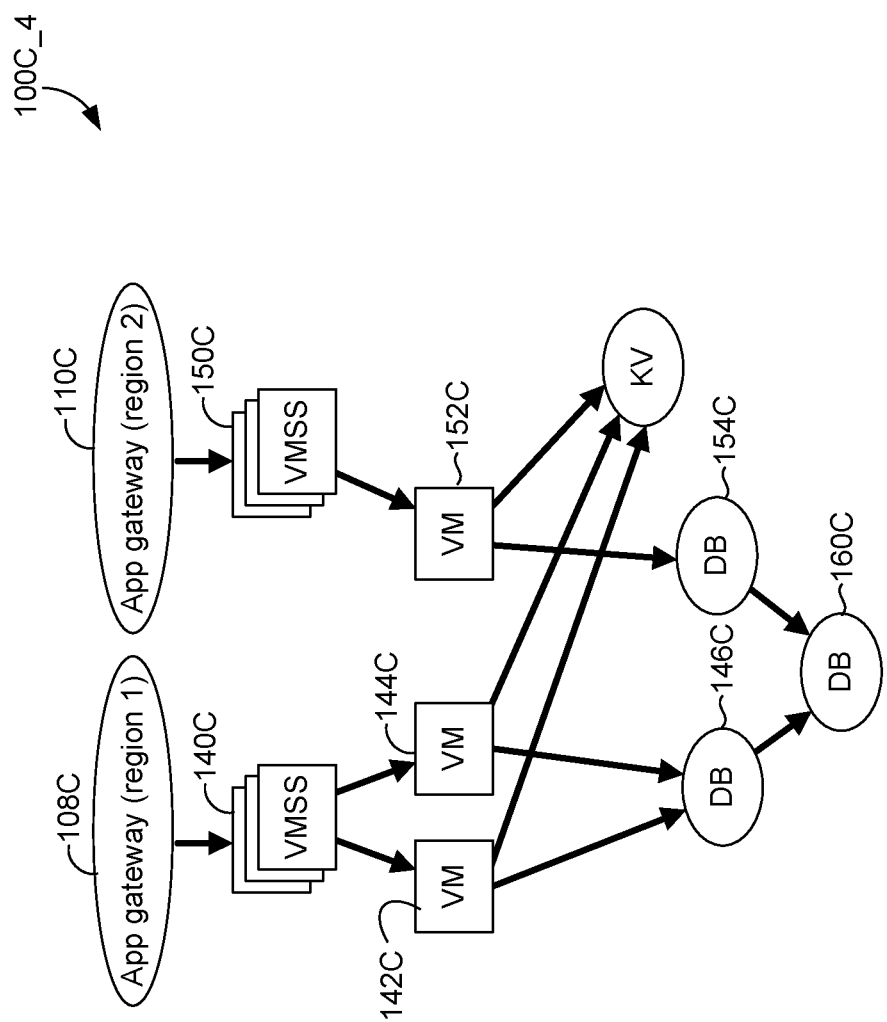

APPLICATION DISCOVERY ENGINE IN A SECURITY MANAGEMENT SYSTEM

BACKGROUND

Users rely on computing environments with applications and services to accomplish computing tasks. Distributed computing systems host and support different types of applications and services in managed computing environments. In particular, computing environments can implement a security management system that provides security posture management functionality and supports threat protection in the computing environments. For example, data security posture management (DSPM), cloud security posture management (CSPM) and enterprise security posture management (collectively "security posture management") can include the following: identifying and remediating risk by automating visibility, executing uninterrupted monitoring and threat detection, and providing remediation workflows to search for misconfigurations across diverse cloud computing environments and infrastructure.

SUMMARY

Various aspects of the technology described herein are generally directed to systems, methods, and computer storage media for, among other things, providing security posture management using an application discovery engine of a security management system. Application discovery supports identifying and mapping various applications within a computing environment. In particular, application discovery can be provided as part of security management operations to assess security posture of applications, identify vulnerabilities, and ensure compliance with regulations—by understanding components and connections of applications. Based on the application discovery, security posture management can be provided to support management of security aspects of data, resources, and workloads in computing environments including identifying and remediating risk.

The application discovery engine operates to provide security posture management based on generating an application discovery graph- and an annotated application discovery graph—using application discovery data (e.g., configuration data, support-text data, and access log data) and executing a plurality of application discovery operations. The application discovery operations are executed to annotate the application discovery graph with annotations that identify a previously unknown security posture information relationships between entities in the application discovery graph. The annotated application discovery graph with the annotations is deployed to support generating security management information. For example, a security administrator can request security posture information of a computing environment, and the security posture information is provided based in part based on the annotated application discovery graph and the annotations.

Conventionally, security management systems are not configured with a comprehensive computing logic and infrastructure to effectively discover applications in a computing environment. For example, an original mapping of applications may be generated; however, the mapping data can go stale if not properly maintained- or can be deficient because the mapping data is manually maintained and susceptible to human errors. Such security management systems lack integration with application discovery operations that improve the accuracy of identifying and mapping various applications within a computing environment. Merely implementing utilizing configurations of cloud resources to determine the mapping of cloud computing applications-causes deficient functioning of the security management system. For example, relying on configurations may generate an excessive number of irrelevant resources per application—and support-text-based techniques are error prone because they rely on the application owner's knowledge of the application and resources. Moreover, without an accurate mapping of applications in a computing environment, potential threats can become actual threats which can lead to unauthorized access to data in the computing environment and malicious operations in the computing environment.

A technical solution—to the limitations of conventional security management systems—can include the challenge of generating an application discovery graph based on application discovery data and employing techniques to simplify the application discovery graph and generate annotations associated with discovered applications—and providing security management operations and interfaces via an application discovery engine in a security management system. As such, the security management system can be improved based on application discovery operations that operate to effectively determine and provide security posture information of a computing environment in a particular manner.

In operation, application discovery data associated with a plurality computing resources of a computing environment is accessed. An annotated application discovery graph comprising a plurality of entities representing the plurality of computing resources is generated. The annotated application discovery graph is deployed to support generating security postures for computing environments. A request is received for a security posture of the computing environment. A security posture visualization associated with the computing environment is generated. The security posture visualization includes an application discovery graph annotation. The security posture visualization is communicated to cause display of the security posture visualization comprising the application discovery graph annotation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIGS. 1C-1K are schematics associated with an exemplary security management system that includes an application discovery engine, in accordance with aspects of the technology described herein;

DETAILED DESCRIPTION

Overview

Figure 1A:
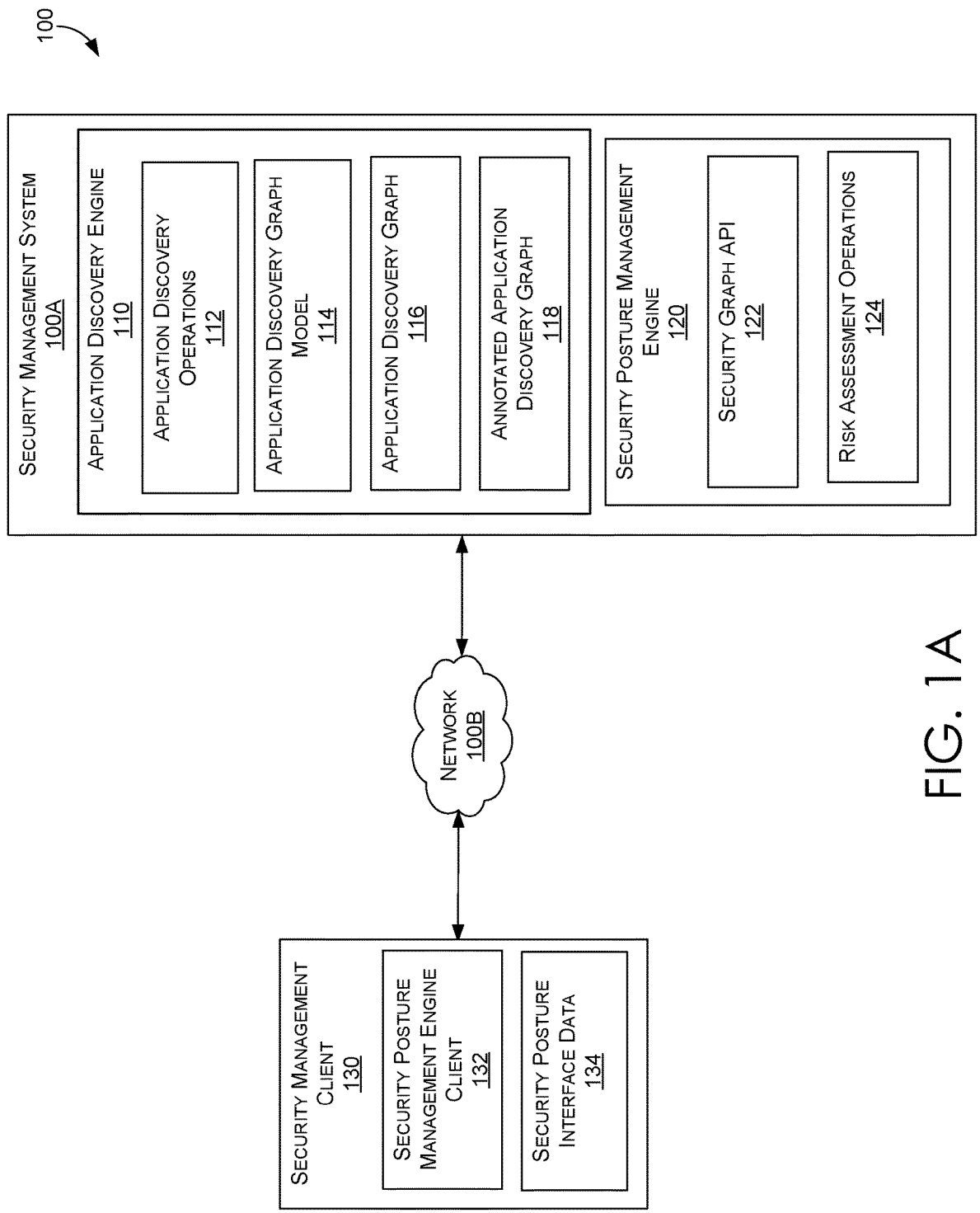
FIGS. 1A and 1B are block diagrams of an exemplary security management system that includes an application discovery engine, in accordance with aspects of the technology described herein.

A security management system supports management of security aspects of data, resources, and workloads in computing environments. The security management system can help enable protection against threats, help reduce risk across different types of computing environments, and help strengthen a security posture of computing environments (i.e., security status and remediation action recommendations for computing resources including networks and devices). For example, the security management system can provide real-time security alerts, centralize insights for different resources, and provide for preventative protection, post-breach detection, and automated investigation, and response. The security management system can support providing security posture management (e.g., data security posture management—DSPM), with security management operations that secure data by ensuring sensitive data has appropriate data security posture regardless of where it is stored or moved to.

Conventionally, security management systems are not configured with a comprehensive computing logic and infrastructure to effectively discover applications in a computing environment. For example, an original mapping of applications may be generated; however, the mapping data can go stale if not properly maintained—or can be deficient because the mapping data is manually maintained and susceptible to human errors. In an agile computing environments—with constantly changing configurations of applications—original application mapping data and manually maintained application mapping data may be outdated relatively quickly as the application configurations keep changing with customer computing demands.

Merely utilizing configurations of cloud resources to determine the mapping of cloud computing applications— causes deficient functioning of the security management system. For example, relying on exclusively on configurations may generate an excessive number of irrelevant resources per applications—and support-text-based techniques are error prone and rely on the application owner's knowledge of the application and resources. A conventional implementation of application discovery can include evaluating production code and dependencies to identify applications. However, this implementation relies on a software delivery pipeline infrastructure which may not be available in all types of computing environments. In addition, the shared resources associated with applications are not identifiable from the software delivery pipeline infrastructure because connections to application are made only after the applications have been deployed in the computing environment.

Other implementations may operate based on deploying agents onto computing resources to identify application; however several different cloud computing service models do not allow deployment of agents on computing resources to avoid disrupting functionality of the computing environments. Moreover, the agents-based implementation may rely on anomaly detection and connected components and methods associated heuristics that cannot effectively detect shared resources. As such, a more comprehensive security management system—with an alternative basis for performing security management operations—can improve computing operations and interfaces for securing management.

Embodiments of the present technical solution are directed to systems, methods, and computer storage media, for among other things, providing security posture management using an application discovery engine of a security management system. Application discovery supports identifying and mapping various applications within a computing environment. In particular, application discovery can be provided as part of security management operations to assess security posture of applications, identify vulnerabilities, and ensure compliance with regulations—by understanding components and connections of applications. Based on the application discovery, security posture management can be provided to support management of security aspects of data, resources, and workloads in computing environments including identifying and remediating risk. Security posture management is provided using the application discovery engine that is operationally integrated into the security management system. The security management system supports an application discovery framework of computing components associated with processing application discovery data for determining a security posture of a computing environment.

At a high level, application discovery operations are based on an algorithm that supports discovering applications in a computing environment based on a combination of application discovery data. Application discovery data refers to information collected and gathered during the process of discovering and identifying applications in a computing environment. Application discovery data can include designated data types associated with systematic exploration and analysis of systems, servers, endpoints, and network traffic to uncover the existence, characteristics, and dependencies of applications.

Application discovery data can specifically include a configuration data types, a support-text data type, and an access log data type (e.g., configuration data, support-text data, and access log data) that are processed via application discovery operations—including security data triangulation operations—to generate an annotated application discovery graph with annotations that support responding to security posture requests. In particular, security data triangulation— via an application discovery graph—involves using different data sources, data types, and graph-based analysis to validate or verify information, enhancing the reliability and credibility of the findings. The technical solution may start with access logs and traffic and determining dependencies between resources and supplementing the access logs with other types application discovery data. By cross-referencing and analyzing application discovery data from different angles, security data triangulation aims to mitigate potential biases, errors, or limitations that may exist in individual data sources. It helps provide more comprehensive and well-rounded security posture information for applications.

Configuration data can include information about application configurations, settings, parameters, and environment variables that include the behavior and functionality of applications. Support-text data can include can include administrator-provided data that includes input provided by system administrators or IT personnel in the context of managing and configuration applications including data or settings that administrators manually enter, update, or specify to define behavior, security, and operational aspects of applications.

Access log data can include information on application requests and communications associated with entities in a computing environment. Access logs (and metadata) can refer to records that contain information about requests made to computing components (e.g., servers) by users or other computing systems. Access logs can be generated when an action is performed (e.g., accessing a web page or requesting a file). Access logs can contain information such as IP address of a client, the time and date of the request, and status information associated with a functionality (e.g., HTTP status code) that is supported. By way of example, a Network Security Group ("NSG") that is a security group that controls inbound and outbound traffic to resources in a cloud computing environment can be associated with a network interface that has access logs (e.g., NSG flow logs and metadata) of different users or systems attempting to access cloud resources. Even when access logs are unavailable or incomplete, the application discovery engine operates to utilize the different application discovery data types to comprehensively discover applications.

Computing environment entities (e.g., cloud entities)—identified via the application discovery data—can be represented in an application discovery graph having the entities as nodes and the access logs as graph edges. The application discovery engine can implement application discovery operations that build spanning trees based on the application discovery graph. The spanning trees that are generated can be compared to each other, and merged based on similarities between spanning trees associated with applications. For example, three spanning tree may be identified, where a first and second spanning tree are merged based on similarity, and a third spanning tree is not merged—thus two spanning trees remain. The application discovery engine can generate an output that includes a mapping of entities (e.g., shared resources and services) to applications that are shared among several applications.

The application discovery engine—via the application discovery graph—can generate annotations to the application discovery graph, where the annotations indicate previously unknown relationships or connections between entities in the application discovery graph. For example, a non-reachable node in the application discovery graph can be identified as a new application; and for each connection to a discovered application a new node is added to the application. The annotated application discovery graph can be deployed to support providing security posture information for a computing environment associated with the applications.

The application discovery engine can be implemented as an agent-less solution that relies on security data triangulation of different data types via a graph data structure. The different data types facilitate providing a comprehensive understanding of different applications in a computing environment. The agent-less implements supports different types of cloud computing models (e.g., Platform as a Service)—which may limit installation of agents of PaaS components. The application discovery engine further does not rely exclusively on a software delivery pipeline, which would not be able to identify shared resources of an application in a computing environment. In this way, the application discovery engine provides application discovery operations for improving security management operations (e.g., application-aware security). The security management operation supports cloud security posture management (CSPM); cloud workload protection platforms (CWPP) and zero trust micro-segmentation (Zero Trust). Security administrators and security management operations can be better and analyzing and monitoring application security. In particular, the application discovery engine can be a key component for application segmentation and allow creation of detections and alerts at the application level. It is contemplated that the technical solution is agnostic to different types of cloud computing provider solutions because the solution primary relies on application discovery data—as described herein.

Advantageously, the embodiments of the present technical solution include several inventive features (e.g., operations, systems, engines, and components) associated with a security management system having an application discovery engine. The application discovery engine supports application discovery operations used to generate an application discovery graph and annotations based on application discovery data—and providing security management operations and interfaces via an application discovery engine in a security management system. The application discovery operations are a solution to a specific problem (e.g., limitations in comprehensive application discovery) in security management. The application discovery engine provides ordered combination of operations for generating an application discovery graph and generating and deploying an annotated application discovery graph in a way that improves computing operations in a security management system. Moreover, large amounts of application configuration information, text-descriptions, and access logs can be filtered and processed to provide security posture information for applications in a particular manner that improves user interfaces of the security management system.

Example Systems and Operations

Figure 1B:
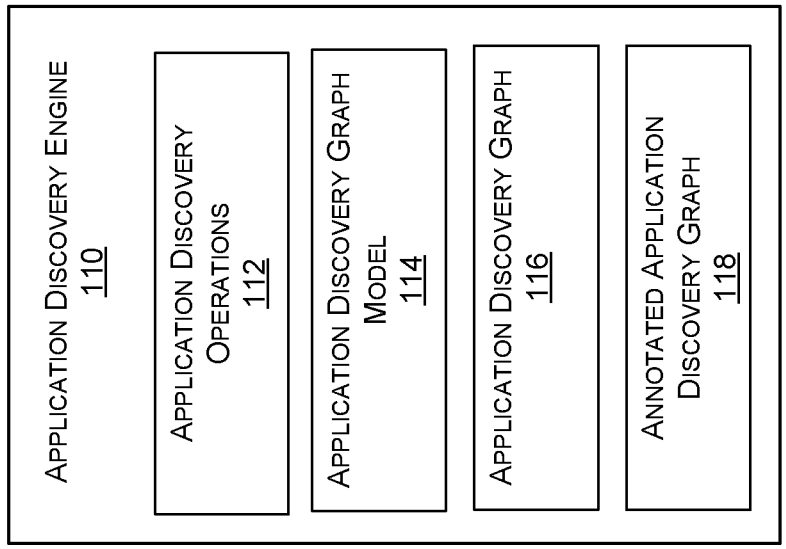

Aspects of the technical solution can be described by way of examples and with reference to FIGS. 1A-1B. FIG. 1A illustrates a cloud computing system (environment) 100 including security management engine 100A; network 100B; application discovery engine 110 having application discovery operations 112, application discovery graph model 114, application discovery graph 116, and annotated application discovery graph 118; security management client 130 with security posture management engine 132 and security posture interface data 134; and security posture management engine 120 with security graph API 122 and risk assessment operations 124.

The cloud computing environment 100 provides computing system resources for different types of managed computing environments. For example, the cloud computing environment 100 supports delivery of computing services—including servers, storage, databases, networking, and security intelligence. A plurality of security management clients (e.g., security management client 130) include hardware or software that access resources in the cloud computing environment 100. Security management client 130 can include an application or service that supports client-side functionality associated with cloud computing environment 100. The plurality of security management clients can access computing components of the cloud computing environment 100 via a network (e.g., network 100B) to perform computing operations.

The security management system 100A is designed to provide security management using the application discovery engine 110. The security management system 100A provides an integrated operating environment based on a security management framework of computing components associated with identifying and mapping various application with a computing environment. The security management system 100A integrates application discovery operations—that support generating an application discovery graph and annotations based on application discovery data—into security management operations and interfaces to effectively provide sensitive data information, security posture information and remediation information for a computing environment. For example, a security administrator can request security posture information of a computing environment, and the security posture information is provided based in part based on the annotated application discovery graph and the annotations. In particular, the application discovery operations generate an application discovery graph based on application discovery data and employing techniques to simplify the application discovery graph and generate annotations that indicate previously unknown relationships or connections between entities in the application discovery graph.

The application discovery engine 110 is responsible for generating the annotated application discovery graph 118 based on application discovery operations 112, application discovery graph model 114 and the application discovery graph 116. The application discovery engine 110 accesses application discovery data from a plurality of data sources. The data sources can include cloud storage, databases, cloud applications, streaming data, service application and external data sources. The data sources support retrieving application discovery data that are associated with different application discovery data types. The data sources are associated with a plurality of computing resources (e.g., virtual machines, storage, databases, tenant, content delivery network, containers, monitoring and analytics, development). The application discovery engine 110 can further include an application discovery data API (not shown) that supports retrieving different types of application discovery data to generates the application discovery graph 116 and the annotated application discovery graph 118. The application discovery engine 110 deploys the annotated application discovery graph 118 to support generating security posture information for a computing environment.

The security posture management engine 120 is responsible for communicating with a security management client 130 having the security posture management engine client 132 and the security incident interface data 134. The security posture management engine client 132 supports client-side security management operations for providing security management in the security management system. The security posture management engine client 132 presenting a security posture visualization including annotations associated with an annotated application discovery graph, and communicating an indication to perform a remediation action for an alert associated with an annotation. As such, the security incident interface data 134 can include data associated with the application discovery engine 110, and data associated with the security posture management 120 which can be communicated between the application discovery engine 110, the security posture management engine 120, and the security management client 130.

The security posture management engine 120 operates to provide visibility to security status of resources in a computing environment. Security posture information can be associated with application data, network, data, and identity resources of a computing environment. Security posture information can include application data security posture information as described herein. Security posture information can specifically include annotations associated with annotated application discovery graph 118 generated using application discovery graph 116. The security posture management engine 120 includes a security graph API 122 that provides access to a security graph (not shown) and security graph data. The security graph provides telemetry data associated with a plurality of resources in a computing environment. In particular, the telemetry data can be security data that is associated with security providers in a computing environment. The security graph and security graph API 122 can support integrating security alerts from different security providers via an API connector that streams alerts to the security posture management engine 120.

The security posture management engine 120 may assess threats and develop risk scores—using risk assessment operations 124 including attack path analysis—associated with threats and attack paths. An attack path analysis can refer to a graph-based algorithm that scans a cloud security graph to identify exploitable paths that attackers may use to breach a computing environment. The attack path analysis exposes attack paths and suggests remediation actions for issues that would break the attack path and prevent a successful breach. In this way, the attack path analysis help address security issues that pose immediate threat with the greatest potential of being exploited in a computing environment. Other variations and combinations of risk assessment operations are contemplated with embodiments of the present disclosure.

A risk associated with an annotation can used to generate security posture information. In particular, a risk score can refer to a numerical value that represents the level of risk associated with a particular security incident associated with the annotation. It takes into account various factors such as the likelihood of the event occurring and the potential impact of the event if it does occur. The risk score is used to prioritize actions and allocate resources accordingly.

The security posture management engine 120 can further support generating security posture visualizations based on the security posture information including annotations associated with the annotated application discovery graph. Security posture information can include the annotations, which can be provided in combination with attack path analysis, alerts, and other security management information. For example, a security posture visualization can annotations that identify a discovered application, or identify an additional nodes (e.g., shared resources or services) associated with an application. The security posture information can be generated based on annotations of the annotated application discovery graph 1148 such that security posture information is prioritized and filtered based on the annotations. A prioritization identifier (e.g., high, medium, low) can be provided in the security posture visualization in combination with an alert associated with a security issue. Alternatively, a notification associated with the security management information, security prioritization information or the alert can be communicated. Other variations and combinations of communications associated with the unsecured credential are contemplated with embodiments described herein.

The security management client 130 can support accessing a security posture visualization and causing display of the security posture visualization. The security management client 130 can include the security posture management engine client 132 that supports receiving the security posture interface data 134 from the security management system 110A and causing presentation of the security posture data 134. The security posture interface data 134 can specifically include security posture visualizations associated with the annotations of an annotated application discovery graph. The secure posture visualization can further include remediation actions associated different alerts—including alerts that are associated with the annotations.

The security management client 130 can further support executing a remediation action. In particular, the security posture visualization can include a remediation action for an alert associated with a scanned data item. The security management client 130 can receive an indication to perform the remediation action associated with an annotation. Based on receiving the indication to execute the remediation action, the security management client 130 can communicate the indication to execute the remediation action to cause execution of the remediation action.

As such, annotations and related security posture information are generated based on the application discovery engine 110C and provided with remediation actions that can be selected and communicated to cause the remediation action to be performed. The remediation action can address an actual threat or potential threat associated with the annotation and alert. For example, a remediation action can include off-boarding a computing device, disabling a user, quarantining a file; turning off external email, or running an antivirus scan. Other variations and combinations of security posture visualizations with the application discovery graph 114 and the annotated application discovery graph 116 are contemplated with embodiments described herein.

With reference to FIG. 1B, FIG. 1B illustrates application discovery engine 110—having application discovery operations 112, application discovery graph model 114, application discovery graph 116, and annotated application discovery graph 118.

The application discovery engine 110 provides an application discovery graph model 114 as a computational model that supports generating the application discovery graph. The application discovery graph model 114 can be associated with operations that are executed to generate the application discovery graph 116. The computational model is configured to access application discovery data and generate the application discovery graph 116 as a representation of the applications in the computing environments based on the application discovery data (e.g., configuration data, support-text data, and access log data). The computational model supports programmatically triangulating application discovery data into the application discovery graph 116. The computational model can also support hierarchical representation of the entities in the application discovery graph 116. The hierarchical representation can include an application discovery graph hierarchy that includes a first level that is an account level (e.g., entities associated with a VNET or PaaS accounts); a second level that is a cloud-resource level (e.g., VM or cloud storage); and a third level that is an operational level (e.g., AKS-pod or VM-process).

The application discovery engine 110 generates application discovery graph 112 based on the application discovery data, where the computing resources are entities in the application discovery graph. By way of illustration, the application discovery graph 116 is generated to include nodes that are entities and edges that connections between entities. Each edge has a weight of the probability that an actual connection will occur between the entities. For example, a first node represents a first virtual machine (VM) and a second node represents a second VM—and an access connection will get a weight of between the two VMS will get a weight of 1, while if the VMs are simply in the same virtual network (VNET), the edge will get a weight of 0.1. The edge weight is configured based on domain or operational knowledge from different entities in the cloud computing environment. In one implementation, the graph is a weighted directed graph with ordered pair G=(V,E) comprising of: V, a set of vertices representing cloud entities (e.g., storage, VM). Each node has features such as: resource id (unique name), resource type. $E \subseteq \{(x,y) \dashv (x,y) \in V^2$ and $x \neq y\}$, a set of directed edges which are ordered pairs of vertices. Each edge has features such as: link type (traffic, allow connections, has permissions), timestamp, and weight.

The application discovery operations 112 can specifically include operations associated with generating annotations of the application discovery graph. The application discovery engine 110 implements an algorithm to support generating an annotated application discovery graph 118 from the application discovery graph 116. As discussed, the application discovery engine 110 uses the application discovery data to build that application discovery graph 116. Annotating the application discovery graph 116 can be based in part on aggregate the weights of all edges connecting a node-pairs. It is contemplated that weights lower than a given threshold can be filtered out of the graph. The application discovery graph 116 is then used to build spanning trees starting entry nodes. Entry nodes refer to nodes that have direct access from the internet or configured to allow internet access. An entry node can be application gateway (or application-level gateway, or application proxy). Traffic that flows to the application via the entry-nodes is considered internet traffic, and in not used in a walk sequence (i.e., walk that refers to a sequence of vertices and edges that are traversed in a graph). The entry-nodes can be associated with external IPs that operate as an indication that they are accessible via the internet.

The application discovery engine 110 can implement a similarity calculation (e.g., Jaccard Index) on the application discovery graph 116 to generate a similarity score for spanning trees of the application discovery graph 116. In operation, spanning trees can be merged based on identifying spanning trees that have shared resources; a determination is made whether a first spanning tree is a sub-tree of another spanning tree; a node similarity between two spanning trees is computed; and a determination is made whether the resources in the spanning trees are the same type. Based on merging the spanning trees, the annotated application discovery graph 118 is generated. An annotation can be based on identifying non-reachable nodes—for example if a node has no edges, it is considered a new application. And, for each connection to a discovered application, a node is added to the application. In this way, the annotated application discovery graph can include annotations that identify discovered applications.

Figure 1C:
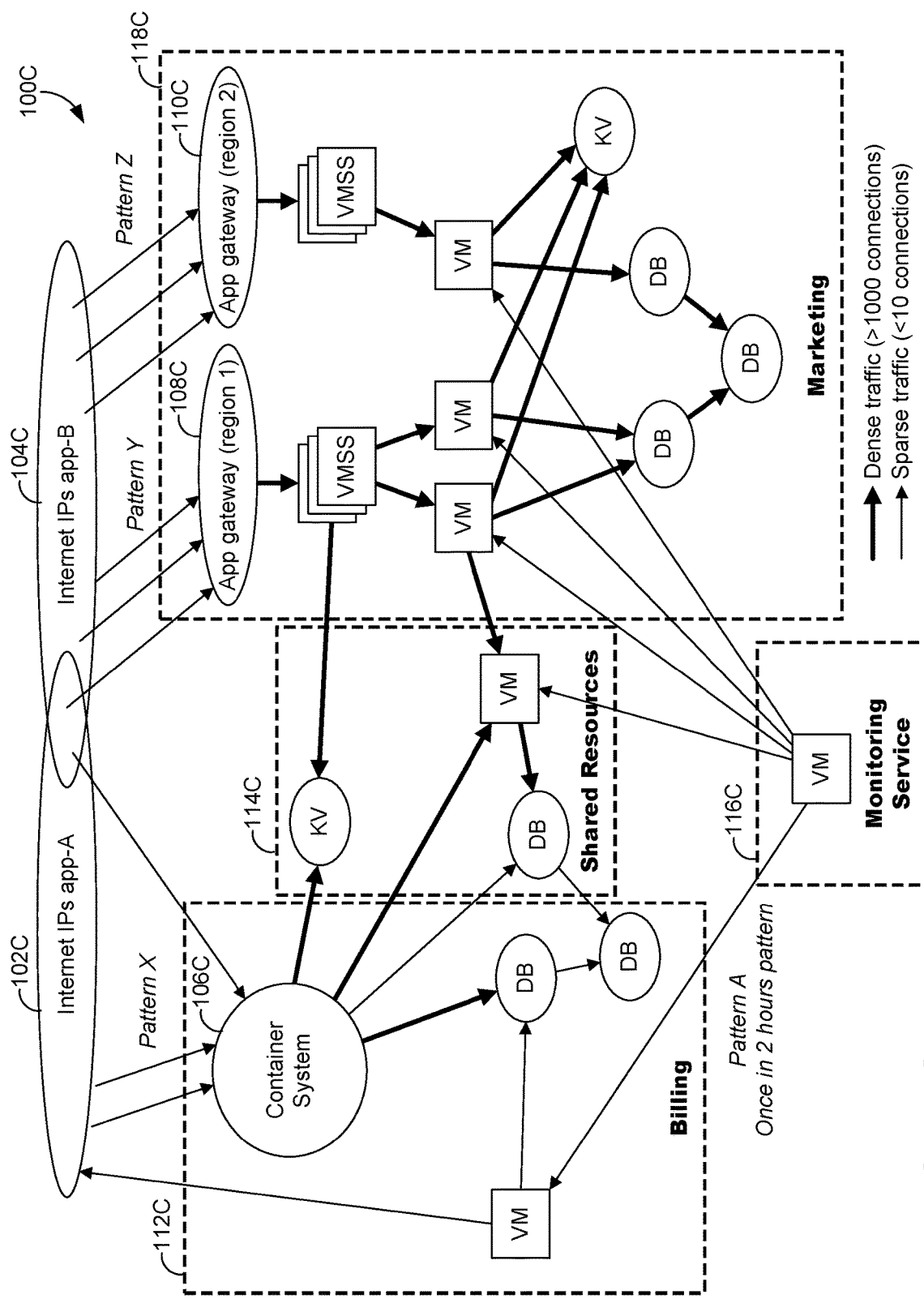

With reference to FIG. 1C-1J, illustrate schematics associated with the application discovery engine 110 in the security management system 100A. FIG. 1C includes an example cloud computing environment 100C with internet IPs app-A 102C and internet IPs app-B 104C; pattern A, pattern X, pattern Y, and pattern Z; container system 106C, app gateway (region 1) 108C and app-gateway 110C; billing application 112C, shared resources 114C, monitoring service 116C, and marketing application 118C.

The internet IPs app-A 102C are associated with internet IPs of a first application (i.e., the billing application 112C) and the internet IPs app-B are associated with internet IPs of a second application (i.e., marketing application 118C). The application gateways (i.e. application gateway (region 1) 108C and application gateway (region 2) 110C) are entry points or intermediary between clients and backend servers in a network infrastructure for an application (e.g., marketing application 118C). The cloud computing environment 110C includes shared resources 114C that are used simultaneously by the applications and/or services (i.e., billing application 112C, marketing application 118C, and monitoring service 116C). The monitoring service 116C supports monitoring and surveillance of the cloud computing environment 100C. The traffic in the cloud computing environment can be dense traffic (e.g., >1000 connections) or sparse traffic (e.g., <10 connections). FIG. 1C can be a representation of an annotated application discovery graph that includes application discovery graph annotations—such as visualizing the traffic flow between computing resources, grouping of computing resources, identifying applications, shared resources, and services, and further identifying roles different computing resources.

Figure 1D:
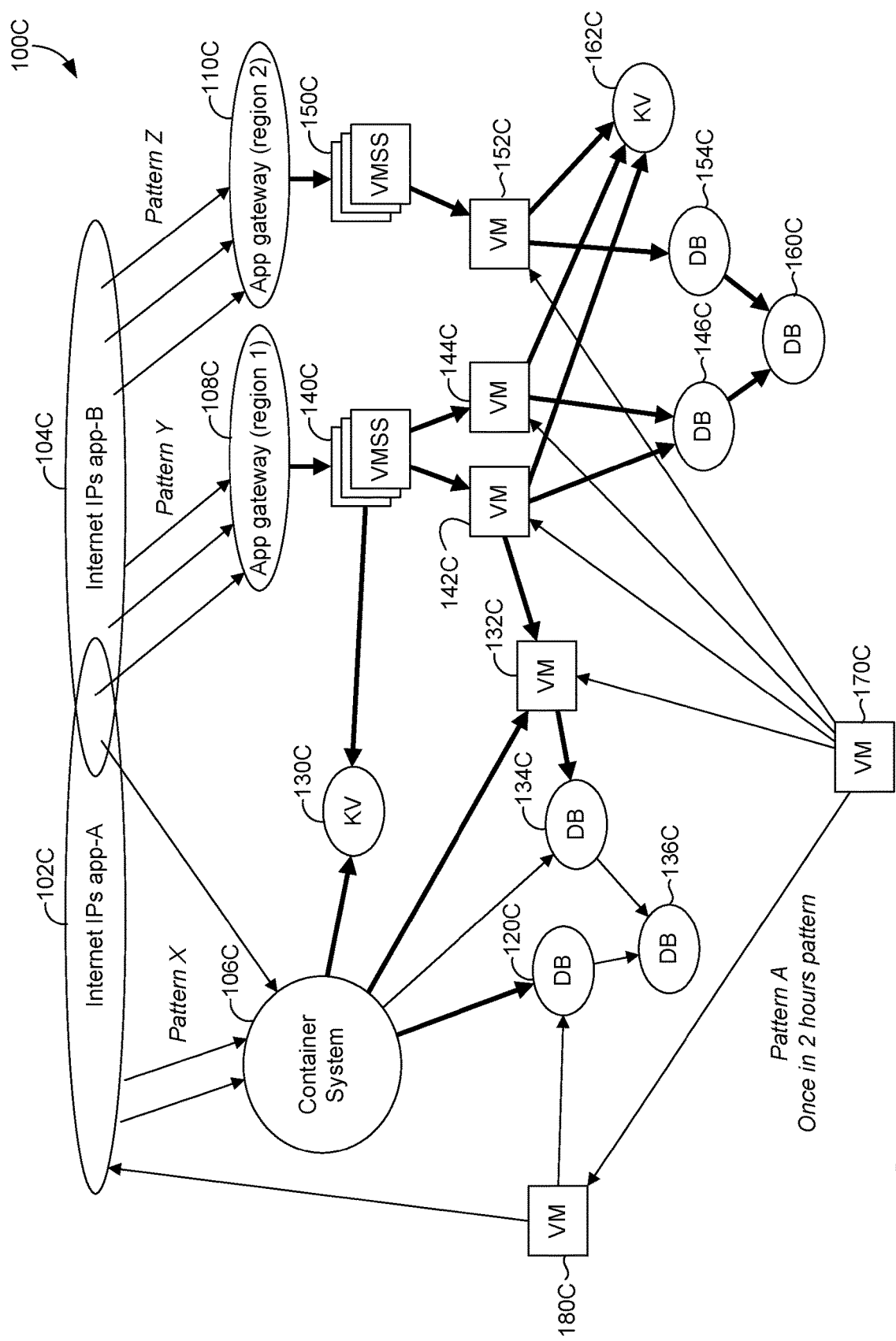

With reference to FIG. 1D, the cloud computing environment 100C represents an application discovery graph that includes entities of the cloud computing environment 100C. The application discovery graph identifies a first set of entities that include internet IPs app-A 102C and internet IPs app-B 104C; pattern A, pattern X, pattern Y, and pattern Z; container system 106C, app gateway (region 1) 108C and app-gateway 110C. The application discovery graph can further identify a second set of entities that are associated with the container system 106C, app gateway (region 1) 108C, and app gateway (region 2) 110C—where the second set of entities are associated with one or more of the container system 106C, app gateway (region 1) 108C, and app gateway (region 2) 110C via a walk.

As illustrated, DB 120C is associated with container system 106C; KV 130C, VM 132C, DB 134C, and DB 136C are associated with container 106C and app gateway (region 1) 108C; VMSS 140C, VM 142C, VM 144C, DB 146C are associated with app gateway (region 1) 108C; VMSS 150C, VM 152C, DB 154C are associated with app gateway (region 2); and DB 160C and KV 162C are associated with app gateway (region 1) 108C and app gateway (region 2) 110C. VM 170C and VM 180C have not been identified via a walk via outputs from either container system 106C, app gateway (region 1) 108C, or app gateway (region 2) 110C.

Figure 1E:
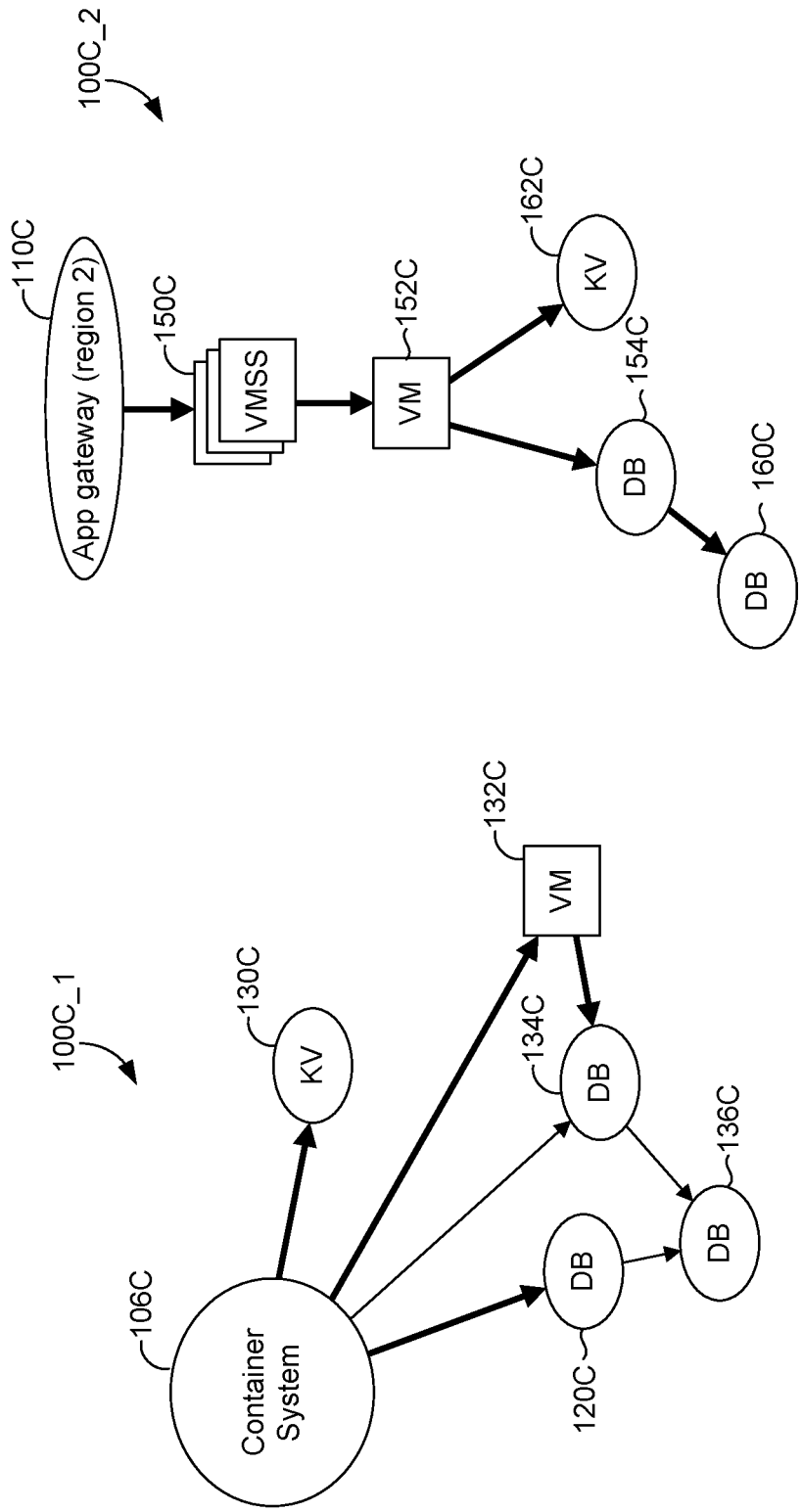

With reference to FIG. 1E, FIG. 1E illustrates a first spanning tree 100C_1 associated with container system 106C including DB 120C, KV 130C, VM 132C, DB 134C, and DB 136C and a second spanning tree 100C_2 associated with app gateway (region 1) 110C including VMSS 150C, VM 152C, DB 154C, DB 160C, and KV 162C. The first spanning tree 100C_1 and the second spanning tree 100C_2 do not share any resources. As such, the first spanning tree 100C_1 and the second spanning tree 100C_2 cannot be merged.

Figure 1F:
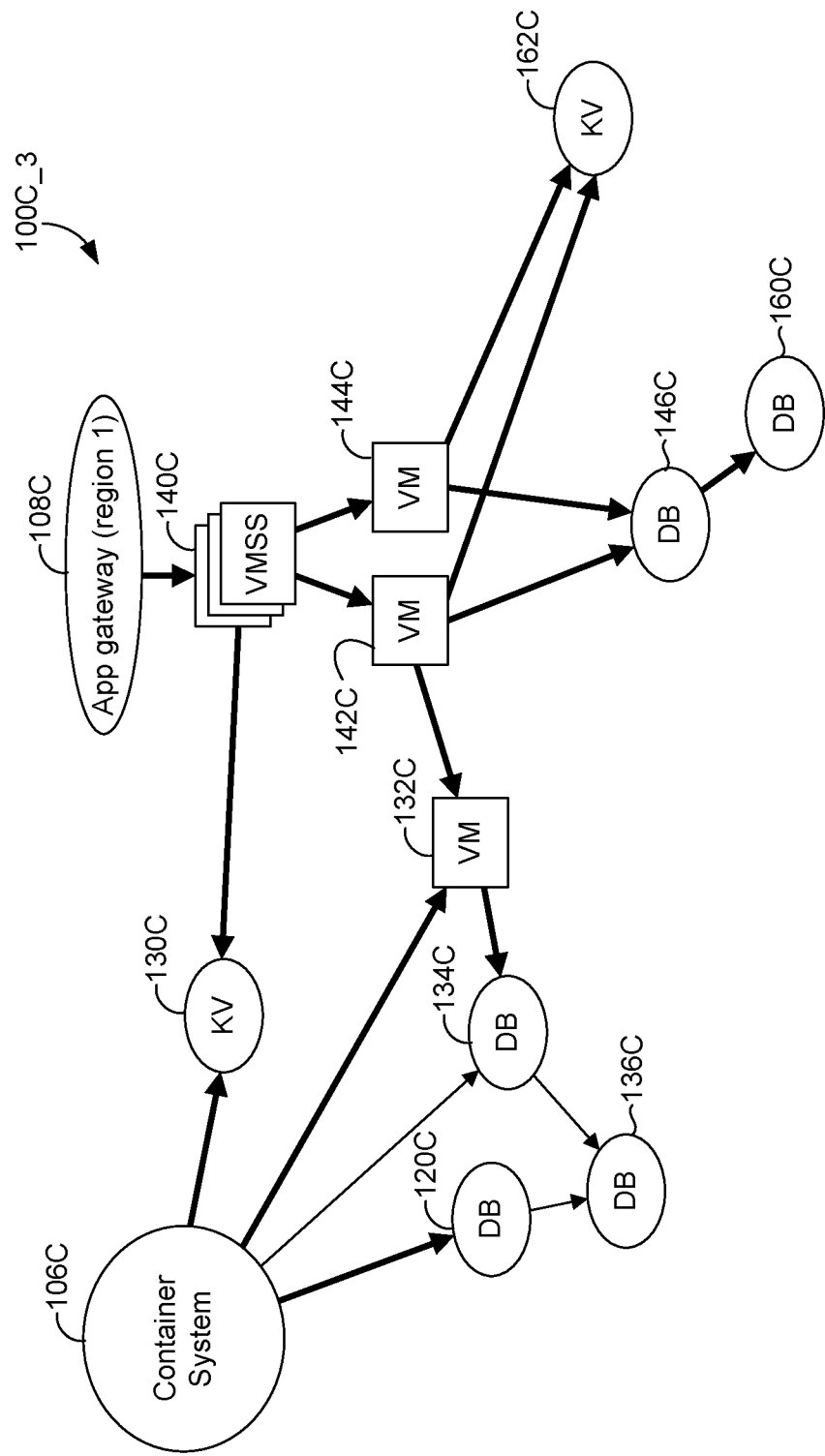

With reference to FIG. 1F, FIG. 1F illustrates a merged spanning tree 100C_3 associated with container system 106C and app gateway (region 1) 108C. The merged spanning tree 100C_3 includes spanning trees associated with container system 106C and app gateway (region 1) 108C that share resources (e.g., 4 resources) For example, a similarity calculator operation can be performed to generate a similarity score (e.g., node Jaccard similarity 4/13≈0.3; with type Jaccard similarity: 3(KV, DB, VM)/6(CS, APP, VMSS)=0.5)

With reference to FIG. 1G, FIG. 1G illustrates another merged spanning tree 100C_4 associated with app gateway (region 1) 108C and app gateway (region 2) 110C. The merged spanning tree 100C_4 includes spanning trees associated with app gateway (region 1) 108C and app gateway (region 2) 110C that share resources (e.g., 2 resources). For example, a similarity calculator operation can be performed to generate a similarity score (e.g., node Jaccard similarity 2/1≈0.18; with type Jaccard similarity 5/5=1).

Figure 1H:
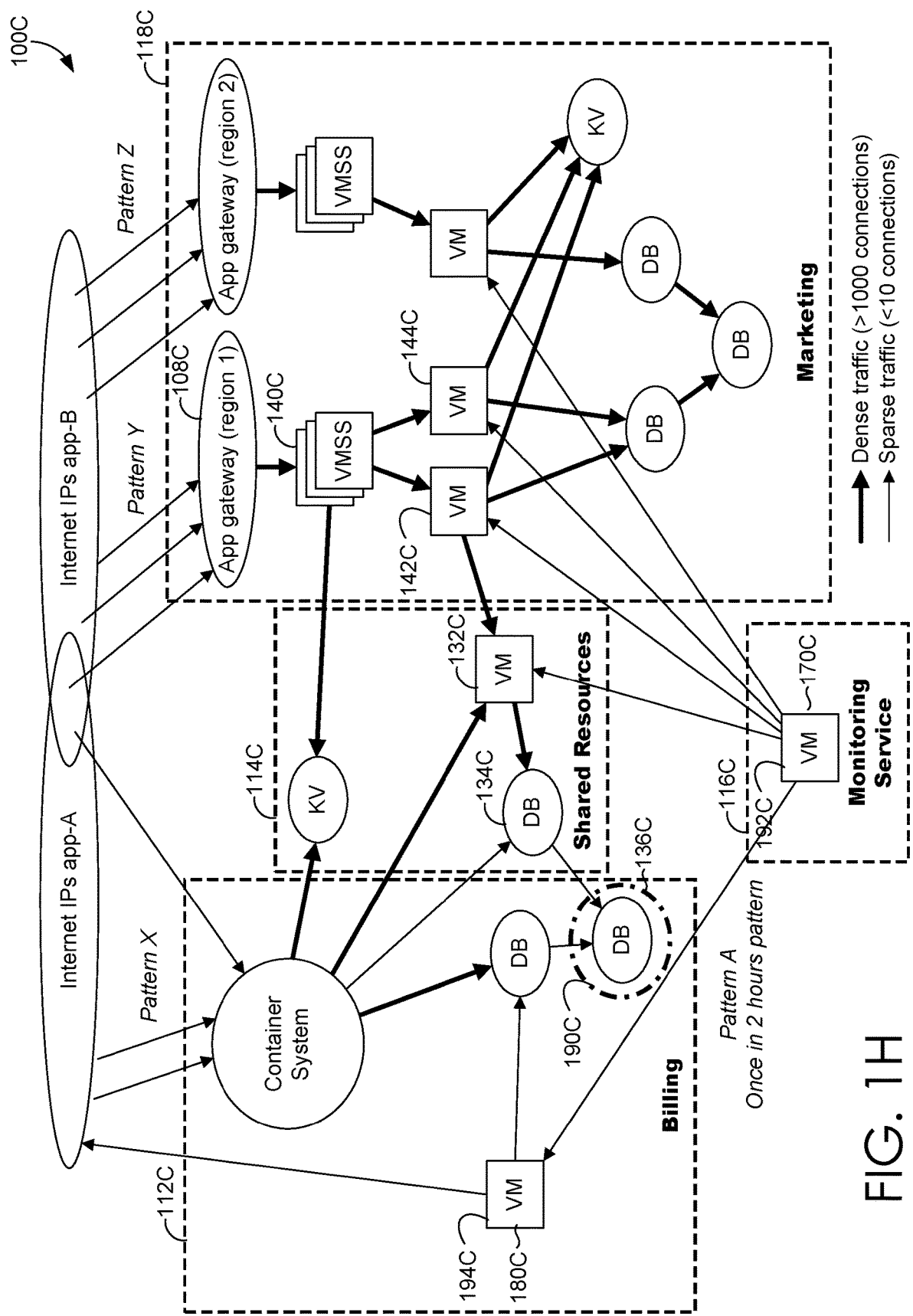

With reference to FIG. 1H, FIG. 1H illustrates a representation of an annotated application discovery graph with an additional annotation 190C that identifies an additional node associated with the marketing application 118C. In particular, the marketing application 118C has access to DB 136C via app gateway (region 1) 108C, VMSS 140C, VM 142C, VM 132C, DB 134C. Additional annotations 192C and 194C are associated with VM 170C and VM 180C illustrating communications. VM 170C can be discovered as a monitoring application that communicates with the billing application 112C, shared resources 114C, marketing application 118C; and the VM 180C communicates with the billing application 112C. As such, non-reachable nodes can be added to the application discovery graph with annotations that annotation identifies a previously unknown security posture relationship or connection between a first entity and one or more of the following: a first application, a second application, a shared resource, or a service resource.

Figure 1I:
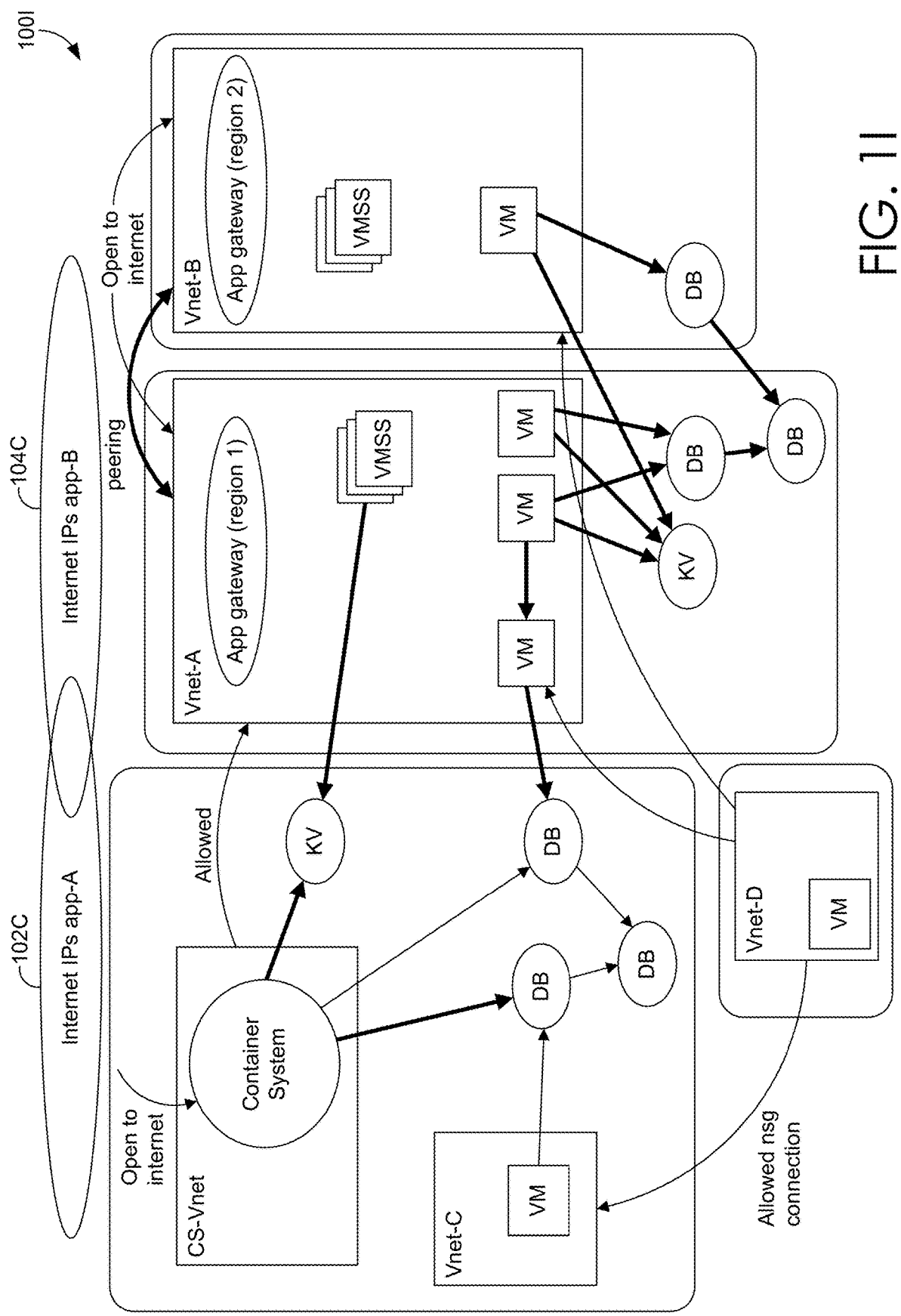
Figure 1J:
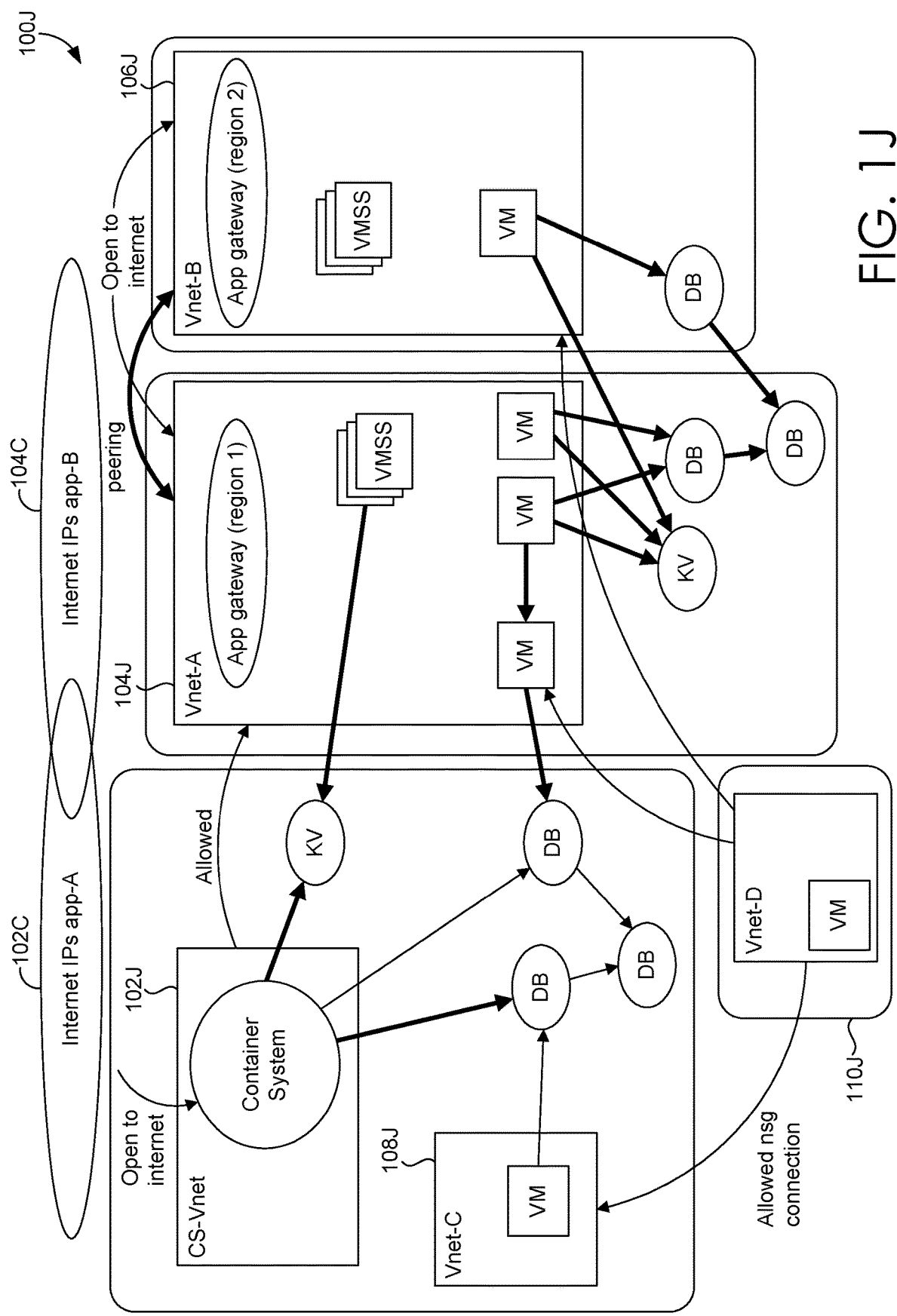
Figure 1K:
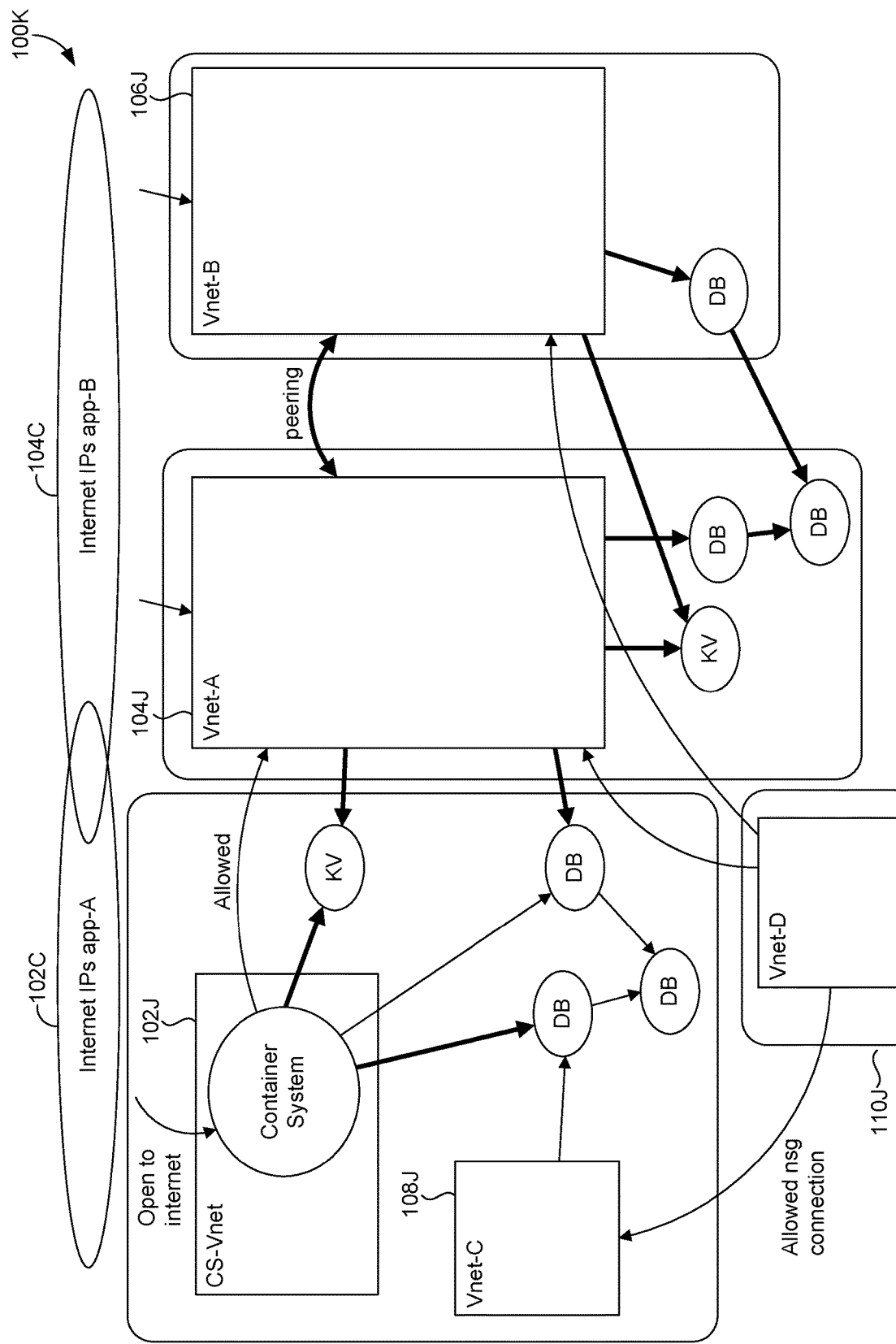

With reference to FIG. 1I, FIG. 1I illustrates cloud computing environment 100I that illustrates an annotated application discovery graph based on VNET data. In particular, VNET data can be used an alternative or in combination with access log data to discover applications. For example, the VNETs can be used instead of the infrastructure (e.g., IaaS with VM/VMSS/app gateway). As shown, the cloud computing environment includes internet IPs app-A 102C and internet IPs app-B 104C. With reference to FIG. 1J, FIG. 1J illustrates cloud computing environment 100J that illustrates an annotated application discovery graph based on VNET data. In particular, VNET data can be used an alternative or in combination with access log data to discover applications. For example, the VNETs can be used instead of the infrastructure (e.g., IaaS with VM/VMSS/app gateway). As shown, the cloud computing environment includes internet IPs app-A 102C and internet IPs app-B 104C; CS-Vnet 102J, Vnet-A 104J, Vnet-B,106J. Vnet-C 108J, and Vnet-D 110J. The cloud computing environment 100J can illustrates an alternate method for application discovery when VNET data is the primary available data for discovery applications. The VNET data may not support pinpointing specific resources, but can still support discovery contextual information associated with applications and discovered resources. This implementation further supports the agentless feature of the functionality described—as agent are not deployed on the VNET or resources when performing application discovery operations.

As such, the application discovery data—with either the application discovery graph representation or the application discovery graph VNET representation—a ground truth understanding of the application can be determined. The application discovery data support determining previously unknown relationships and contextual information between entities. Two applications with different business criticality designation can be configured and segmented in a computing environment. As such, no network connection should be open between the applications that allows communications between VMs in each of the different computing environments. Moreover, user identities should not have unauthorized access to the applications. In general, certain governance settings associated with application restrict how applications operate in a computing environment. Nonetheless, over time, configurations associated with application may be inadvertently or erroneously reconfigured. As such, the application discovery operations can support discovering applications to ensure the governance settings being complied.

For example, a determination can be made that a first VM associated with a first application that processes sensitive data is communicating with a second VM that is associated with a second application that does not process sensitive data. Such a connection between the first VM and the second VM- and their applications—can be identified and flagged using in the annotated application discovery graph. Communications between applications can also simply be anomalous, which can be discovered using application discovery operations. Moreover, some applications may inadvertently subscribe to shared services or resources and as such expose the application to unintended data or threats. As such, understanding the application discovery operations understanding contextual information and grouping infrastructure associated with applications to continuously monitor and ensure secure configuration of the computing environment.

Figure 2A:
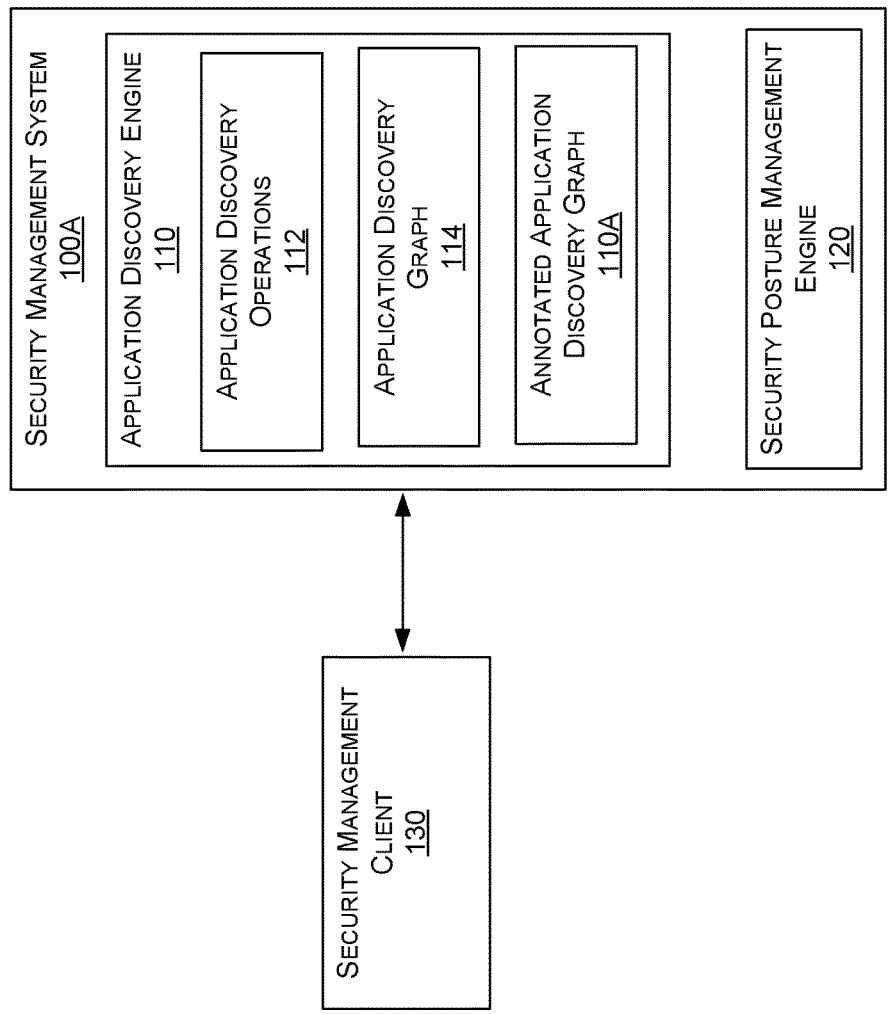
FIG. 2A is a block diagram of an exemplary security management system that includes an application discovery engine, in accordance with aspects of the technology described herein.
Figure 2B:
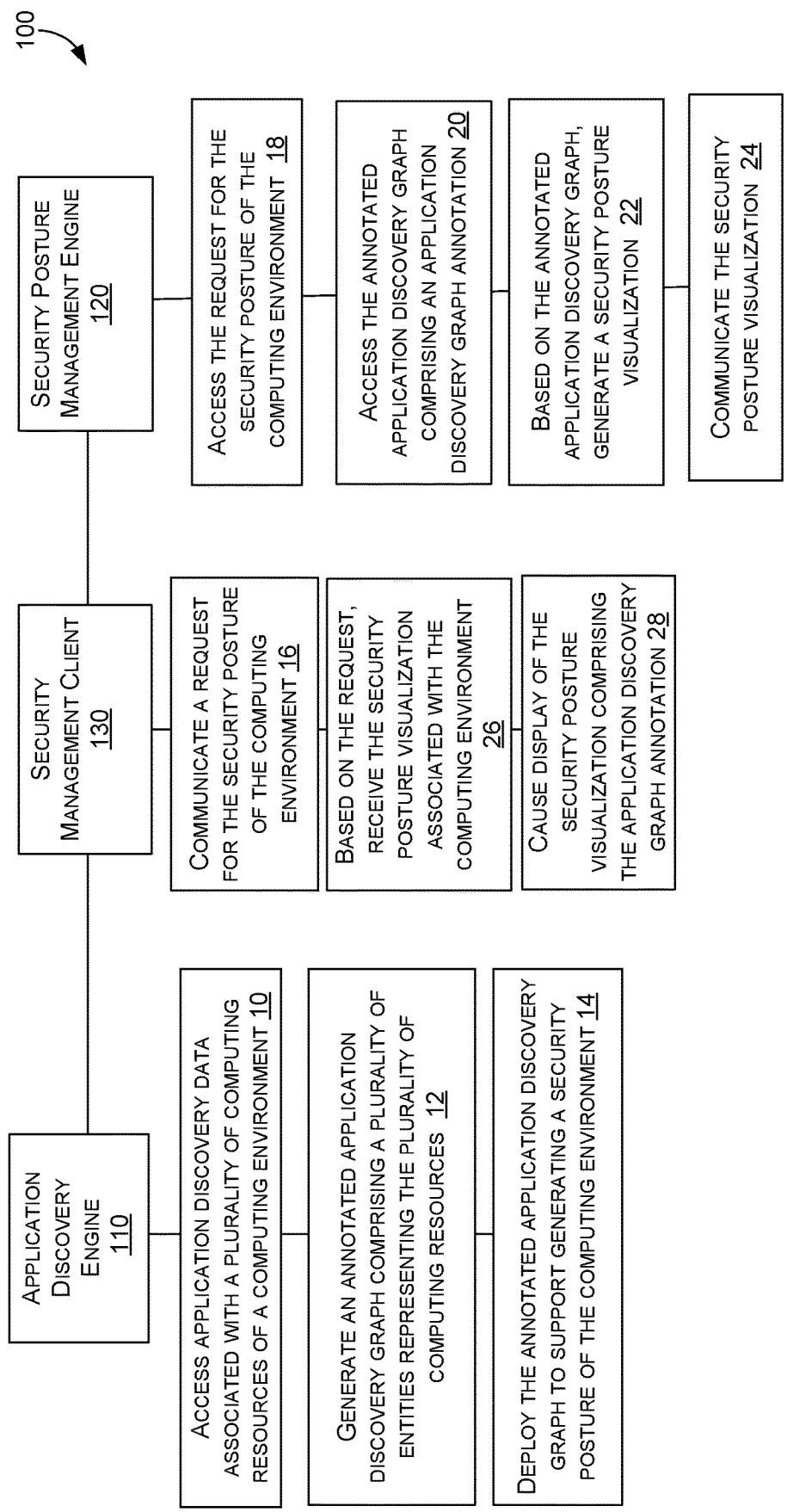
FIG. 2B is a block diagram of an exemplary security management system that includes an application discovery engine, in accordance with aspects of the technology described herein.

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example security management system 100 in which methods of the present disclosure may be employed. In particular, FIG. 2A shows a high level architecture of the security management system 100A in accordance with implementations of the present disclosure. Among other engines, managers, generators, selectors, or components not shown (collectively referred to herein as "components"), the technical solution environment of security management system 100 corresponds to FIGS. 1A and 1B.

With reference to FIG. 2A, FIG. 2A illustrates a security management system 100A having security management system 100A, application discovery engine 110 including application discovery operations 112, application discovery graph model 114, application discovery graph 116, and annotated application discovery graph 118; security posture management engine 120, and security management client 130.

The application discovery engine 110 is responsible for generating the application discovery graph 116 and the annotated application discovery graph 118 based on application discovery operations 112, where the application discovery graph 116 and the annotated application discovery graph 118 support discovery identifying and mapping various applications within the cloud computing environment 100. The application discovery engine 110 support generating a plurality of application discovery graph annotations, where an application discovery graph annotation is security posture information of an entity in the annotated application discovery graph 118. The security posture information is derived based on executing the application discovery operations 112 on the application discovery graph 116.

The application discovery engine 110 accesses application discovery data of a computing environment (e.g., cloud computing environment 100). The application discovery data is associated with a plurality of resources of the computing environment. The application discovery data are associated with a plurality of application discover data types that are retrieved from a plurality of data sources. The plurality of application discovery data types include a configuration type, a text-description type, and an access log type. The plurality of application discovery data types support security data triangulation associated with application discovery operations.

The application discovery engine 110 generates the annotated application discovery graph 118 that includes a plurality of entities representing the plurality of computing resources. The application discovery engine 110 generates the annotated application discovery graph 118 based on executing the application discovery operations 112 that annotate the application discovery graph 112 with one or more application discovery graph annotations. The application discovery graph annotations can be generated based on analyzing one or more spanning trees in the application discovery graph 112. The application discovery graph 116 can include a first set of entities associated with a first application, a second set of entities associated with a second application, a third set of entities identifies as shared resources; and a fourth set of entities identified as service resources.

The application discovery operations 112 that support generating the annotated application discovery graph include: assigning weights to a plurality edges in the application discovery graph; assigning operational levels to the plurality of entities; and identifying similarities between walk sequences in the application discovery graph. The application discovery operations can further include: using the application discovery graph 116 to generate a plurality of spanning trees based on entry node that are internet-accessible; merging the plurality spanning tree based on a similarity score between the plurality of spanning trees; and generating an application discovery graph annotation. The application discovery graph annotation identifies a previously unknown security posture relationship or connection between a first entity and one or more of the following: a first application, a second application, a shared resource, or a service resource. For example, the application discovery graph annotation can be for a node that has no edges, where the application discovery graph annotation identifies the node as a discovered application. The application discovery engine 110 deploys the annotated application discovery graph to support generating a security postures for a computing environment.

The security posture management engine 120 is responsible for processing security posture information associated with the application discovery engine 110. The security posture management engine 120 accesses the annotated application discovery graph, and uses the annotated application discovery graph to generate a security posture visualization. The security management client 130 communicates a request for a security posture of a computing environment, and based on the request, the security posture management engine 120 communicates the security posture visualization comprising the application discovery graph annotation.

The security management client 130 causes display of the security posture visualization. The security posture visualization can include an alert associated with the application discovery graph annotation, where the alert is associated with a prioritization identifier and a remediation action. The prioritization identifier is based on the application discovery graph annotation and the remediation action is executable to address a security threat associated with the alert. The security management client 130 receives an indication to execute a remediation action associated with application discovery graph annotation, the remediation action is associated with the security posture visualization, and communicates the indication to cause execution of the remediation action.

With reference to FIG. 2B, FIG. 2B illustrates a security management system 100A having application discovery engine 110, security management client 130, and security posture management engine 120. At block 10, the application discovery engine 110 accesses application discovery data associated with a plurality computing resources of a computing environment; at block 12, generates an annotated application discovery graph comprises a plurality of entities representing the plurality of computing resources; and at block 14, deploys the annotated application discovery graph to support generating a security posture the computing environment. At block 16, the security management client 130 communicates a request for the security posture of the computing environment.

At block 18, the security posture management engine, accesses the request for the security posture of the computing environment; at block 20, accesses the annotated application discovery graph comprising an application discovery graph annotation; at block 22, based on the application discovery graph, generates a security posture visualization; and at block 24 communicates the security posture visualization. At block 26, the security management client 130, based on the request receives the security posture visualization associated with the computing environment; and at block 28, causes display of the security posture visualization comprising the application discovery graph annotation.

Example Methods

Figure 3:
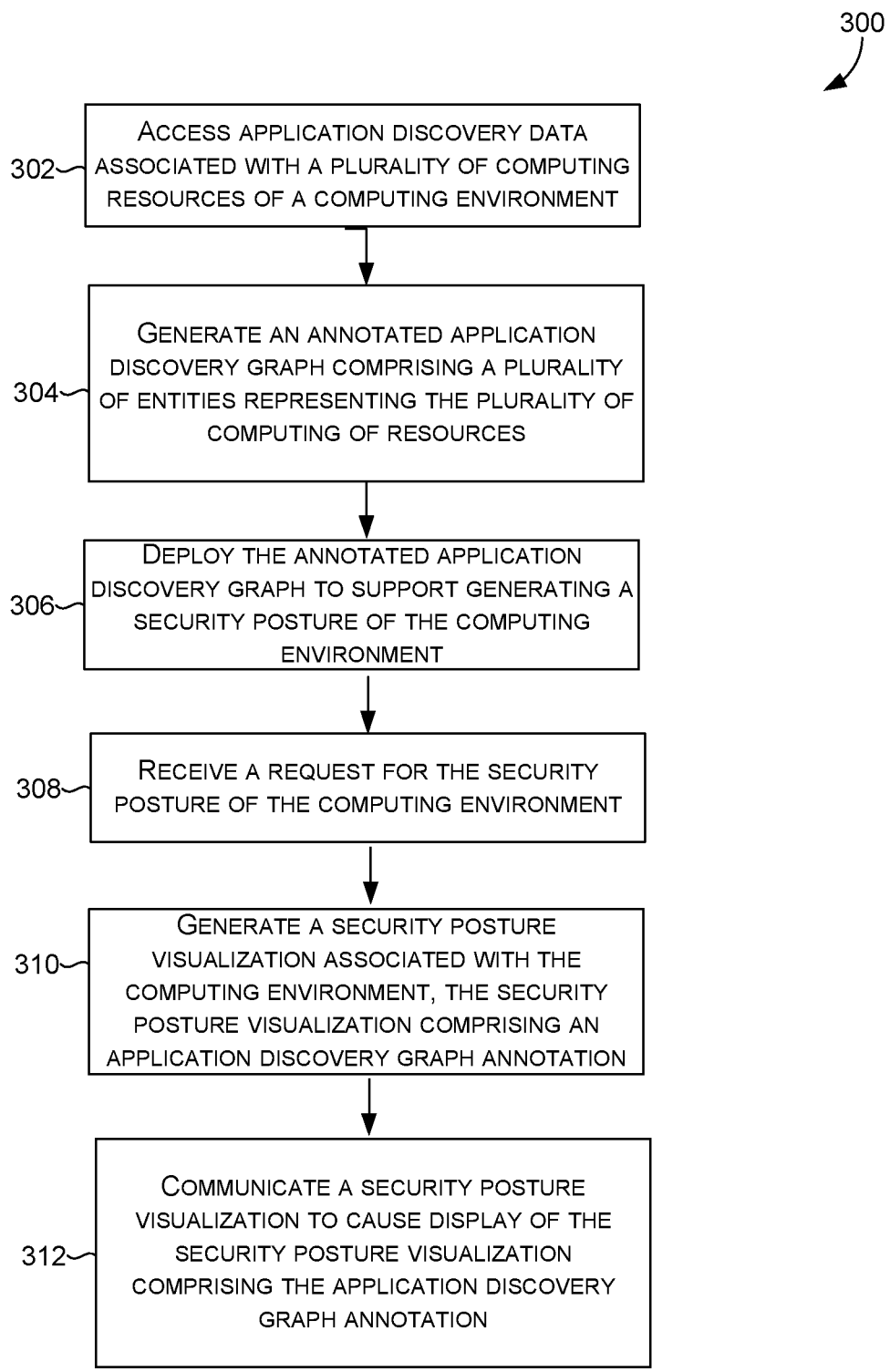
FIG. 3 provides a first exemplary method of providing security posture management using an application discovery engine, in accordance with aspects of the technology described herein.
Figure 4:
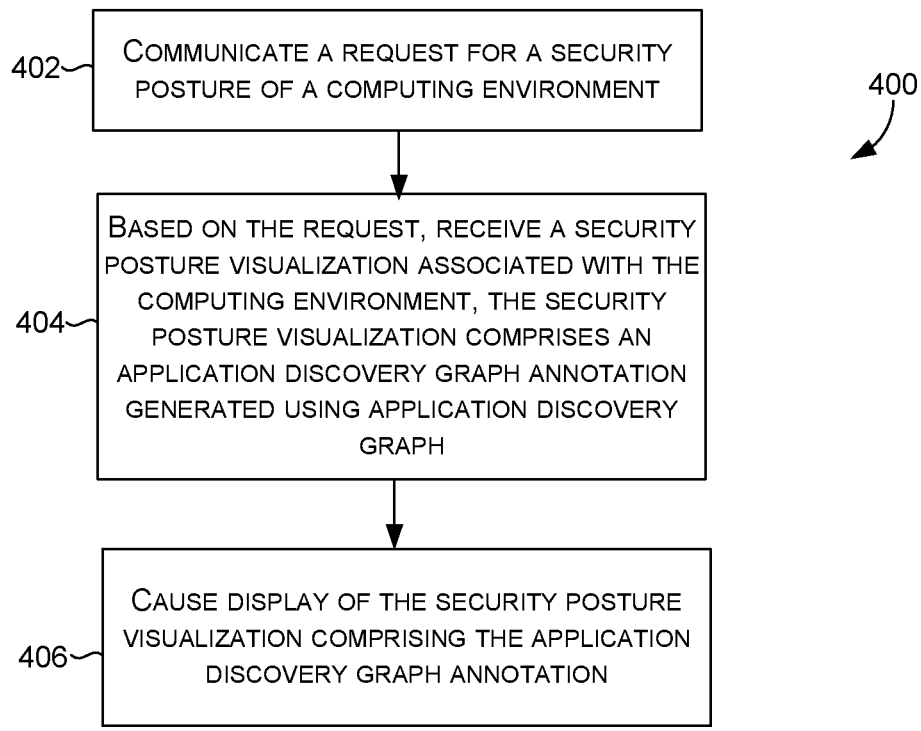
FIG. 4 provides a second exemplary method of providing security posture management using an application discovery engine, in accordance with aspects of the technology described herein.
Figure 5:
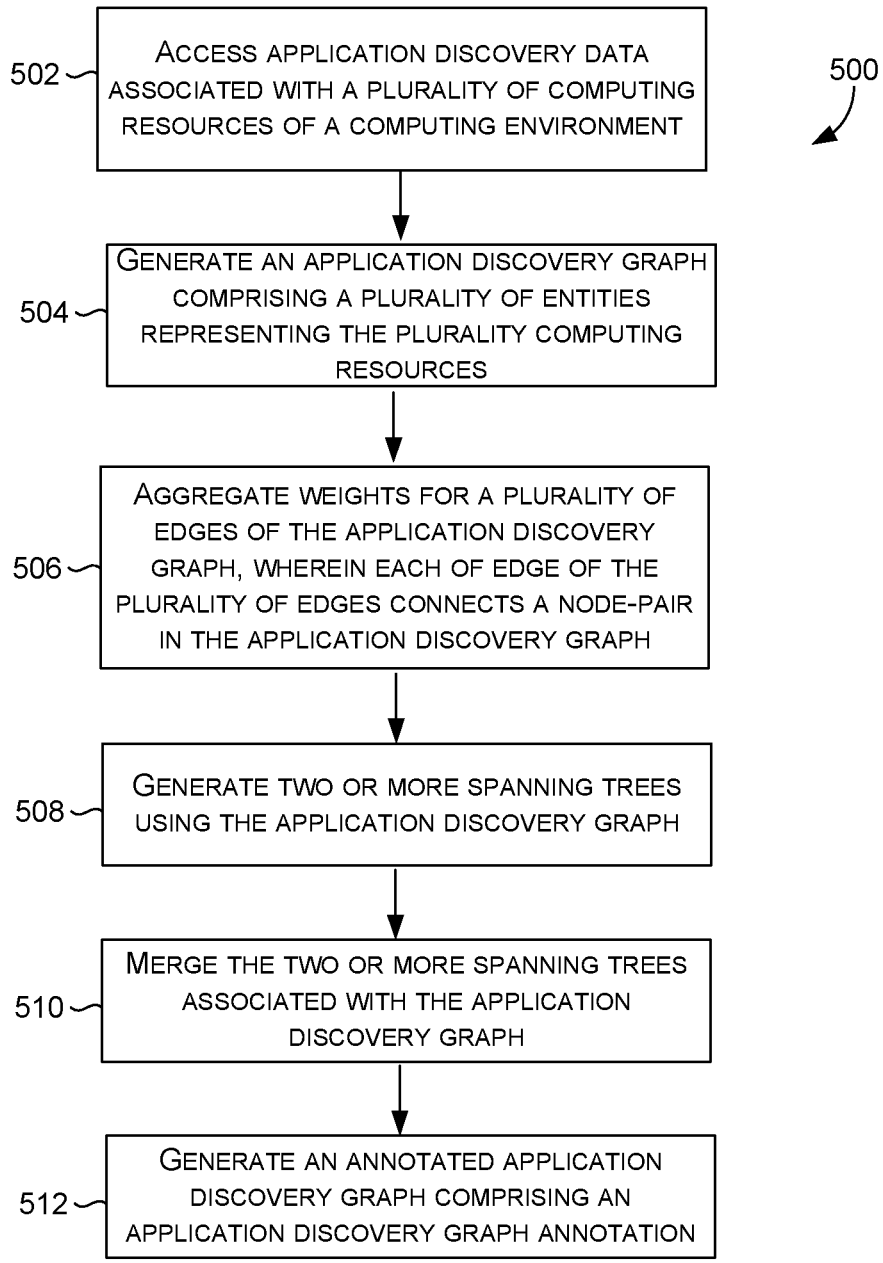
FIG. 5 provides a third exemplary method of providing security posture management using an application discovery engine, in accordance with aspects of the technology described herein.

With reference to FIGS. 3, 4, and 5, flow diagrams are provided illustrating methods for providing security posture management using an application discovery engine in a security management system. The methods may be performed using the security management system described herein. In embodiments, one or more computer-storage media having computer-executable or computer-useable instructions embodied thereon that, when executed, by one or more processors can cause the one or more processors to perform the methods (e.g., computer-implemented method) in the security management system (e.g., a computerized system or computing system).

Turning to FIG. 3, a flow diagram is provided that illustrates a method 300 for providing security posture management using an application discovery engine in a security management system. At block 302, application discovery data associated with a plurality of computing resources of a computing environment is accessed. At block 304, an annotated application discovery graph is generated, where the annotated application discovery graph comprises a plurality of entities representing the plurality of computing resources. At block 306, the annotated application discovery graph is deployed to support generating a security posture of the computing environment. At block 308, a request for the security posture of the computing environment is received. At block 310, a security posture visualization associated with the computing environment is generated, where the security posture visualization comprises an application discovery graph annotation. At block 312, a security posture visualization is communicated to cause display of the security posture visualization comprising the application security graph annotation.

Turning to FIG. 4, a flow diagram is provided that illustrates a method 400 for providing security posture management using an application discovery engine in a security management system. At block 402, a request for a security posture of a computing environment is communicated. At block 404, based on the request, a security posture visualization associated with the computing environment is received, the security posture visualization comprises an application security graph annotation. At block 406, the security posture visualization comprising the application discovery graph annotation is caused to be displayed.

Turning to FIG. 5, a flow diagram is provided that illustrates a method 500 for providing security posture management using an application discovery engine in a security management system. At block 502, an application discovery data associated with a plurality of computing resources of a computing environment is accessed. At block 504, an application discovery graph comprising a plurality of entities representing the plurality of computing resources is generated. At block 506, weights for a plurality of edges of the application discovery graph are aggregated, where each edge of the plurality of edges connects a node-pair in the application discovery graph. At block 508, two or more spanning trees are generated using the application discovery graph. At block 510, the two or more spanning trees associated with the application discovery graph are merged. At block 512, an annotated application discovery graph is generated, where the annotated application discovery graph comprises an application discovery graph annotation.

Technical Improvement

Embodiments of the present technical solution have been described with reference to several inventive features (e.g., operations, systems, engines, and components) associated with a security management system. Inventive features described include: operations, interfaces, data structures, and arrangements of computing resources associated with providing the functionality described herein relative with reference to an application discovery engine. Functionality of the embodiments of the present technical solution have further been described, by way of an implementation and anecdotal examples—to demonstrate that the operations (e.g., generating an application discovery graph and annotating the application discovery graph using application discovery operations) for providing the application discovery engine. The application discovery engine is as a solution to a specific problem (e.g., inaccurate and inefficient mapping of applications in a computing environment) in security management technology. The application discovery engine improves computing operations associated with application discovery and providing security posture information in security management systems. Overall, these improvements result in less CPU computation, smaller memory requirements, and increased flexibility in security management systems when compared to previous conventional security management system operations performed for similar functionality.

Additional Support for Detailed Description

Example Distributed Computing System Environment

Figure 6:
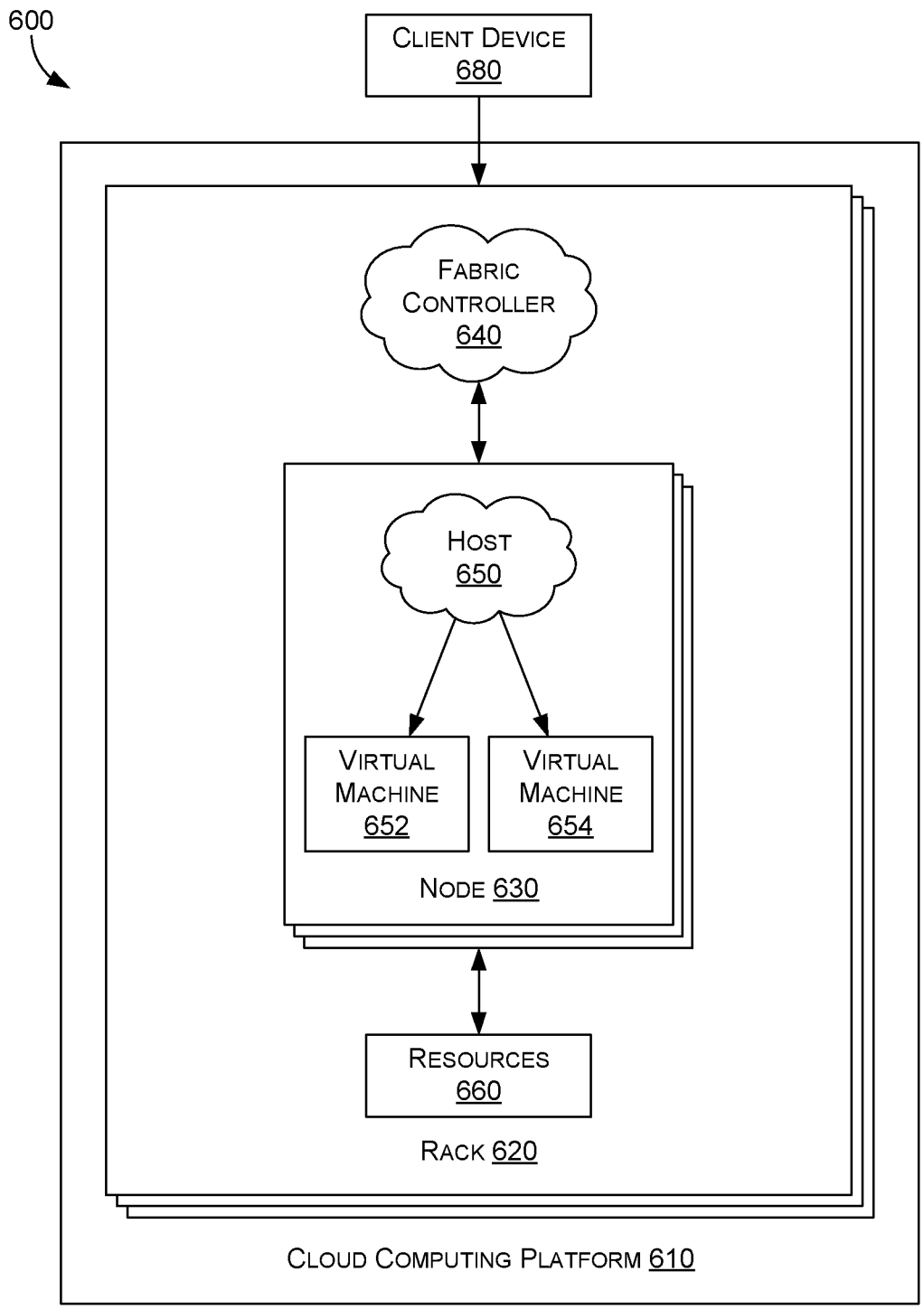
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Having briefly described an overview of embodiments of the present technical solution, an example operating environment in which embodiments of the present technical solution may be implemented is described below in order to provide a general context for various aspects of the present technical solution. Referring initially to FIG. 6 in particular, an example operating environment for implementing embodiments of the present technical solution is shown and designated generally as computing device 600. Computing device 600 is but one example of a suitable computing environment and is not intended to suggest any limitation as to the scope of use or functionality of the technical solution. Neither should computing device 700 be interpreted as having any dependency or requirement relating to any one or combination of components illustrated.

The technical solution may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technical solution may be practiced in a variety of system configurations, including hand-held devices, consumer electronics, general-purpose computers, more specialty computing devices, etc. The technical solution may also be practiced in distributed computing environments where tasks are performed by remote-processing devices that are linked through a communications network.

Figure 7:
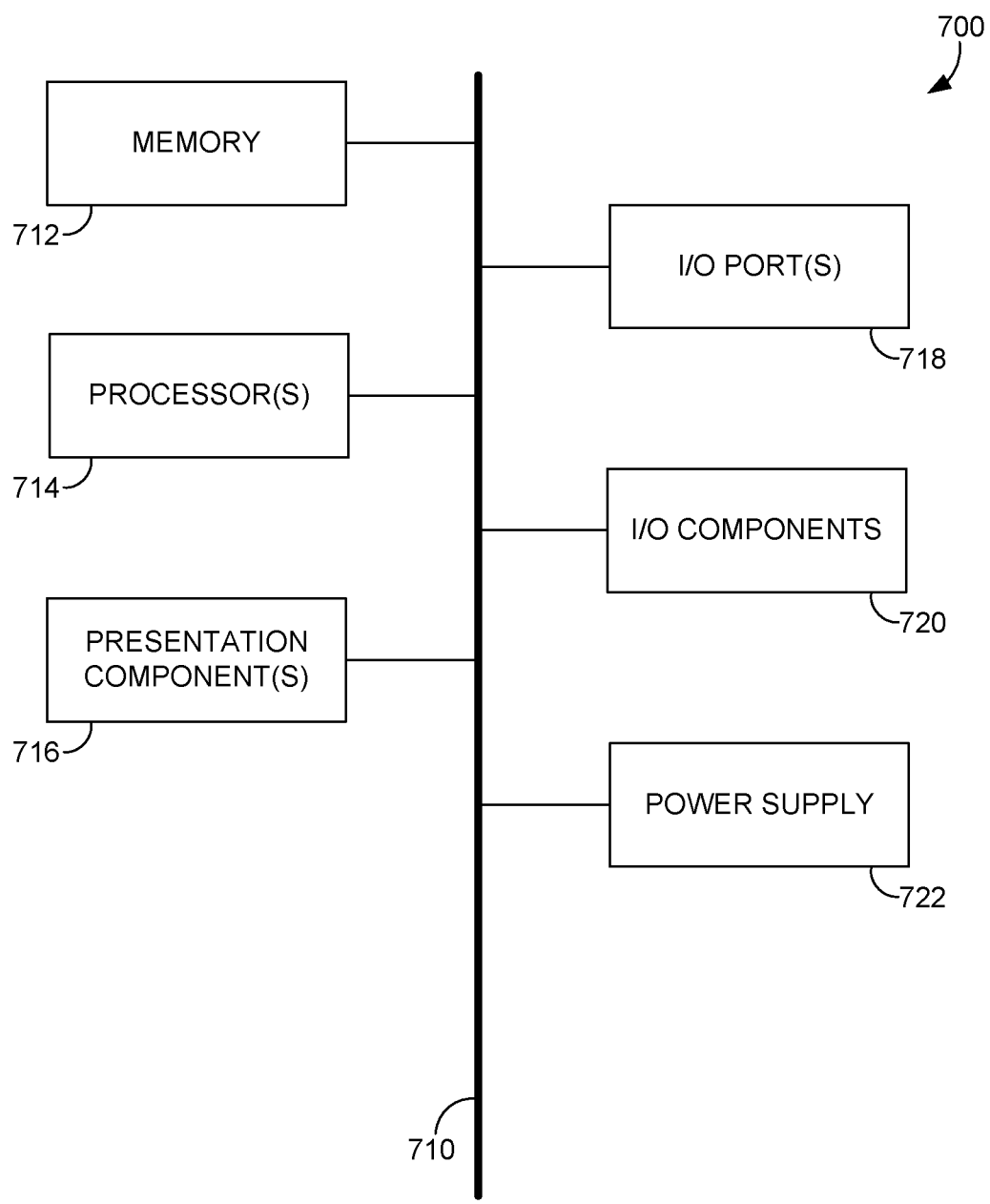
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present technical solution. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technical solution is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving." or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technical solution are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present technical solution may generally refer to the technical solution environment and the schematics described herein, it is understood that the techniques described may be extended to other implementation contexts.

Embodiments of the present technical solution have been described in relation to particular embodiments which are intended in all respects to be illustrative rather than restrictive. Alternative embodiments will become apparent to those of ordinary skill in the art to which the present technical solution pertains without departing from its scope.

From the foregoing, it will be seen that this technical solution is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
   one or more computer processors; and computer memory storing computer-useable instructions
that, when used by the one or more computer processors, cause the one or more computer processors to
perform operations, the operations comprising:
accessing application discovery data associated with a
plurality of computing resources of a computing environment;
based on the application discovery data, generating an
annotated application discovery graph comprising a
plurality of entities representing the plurality of computing resources, wherein generating the annotated
application discovery graph comprises executing a plurality of application discovery operations that annotate
the application discovery graph with one or more
application discovery graph annotations based on analyzing one or more spanning trees in the application
discovery graph,
wherein analyzing the plurality of spanning trees comprises comparing a first spanning tree to a second
spanning tree and merging the first spanning tree to the
second spanning tree based on similarities to support
mapping of entities with shared resources or services
between the first spanning tree and the second spanning
tree;
deploying the application discovery graph to support
generating a security posture of the computing environment;
receiving a request for the security posture of the computing environment;
using the annotated application discovery graph, generating a security posture visualization associated with
the computing environment, wherein the security posture visualization comprises an application discovery
graph annotation; and
communicating the security posture visualization to cause
display of the security posture visualization comprising
the application discovery graph annotation.

2. The system of claim 1, wherein the application discovery data are associated with a plurality of application discovery data types that are retrieved from a plurality of data sources, wherein the plurality of application discovery data types include a configuration type, a text-description type, and an access log type, wherein the plurality of application discovery data types support security data triangulation associated with the application discovery operations.

3. The system of claim 1, further comprising an application discovery engine that supports generating a plurality of application discovery graph annotations, wherein the application discovery annotation is security posture information of an entity in the annotated application discovery graph that is derived based on executing the application discovery operations on the application discovery graph.

4. The system of claim 1, wherein generating the annotated application discovery graph is based on the application discovery graph comprising the plurality of entities representing the plurality of computing resources, wherein the application discovery graph is annotated based on two or more of the following:
assigning weights to a plurality of edges in the application
discovery graph;
assigning operational levels to the plurality of entities;
and
identifying similarities between walk sequences in the
application discovery graph.

5. The system of claim 1, wherein the application discovery graph comprises two or more of the following: a first set of entities associated with a first application, a second set of entities associated with a second application, a third set of entities identified as shared resources, and a fourth set of entities identified as service resources.

6. The system of claim 1, wherein executing the plurality of application discovery operations comprises:
using the application discovery graph, generating a plurality of spanning trees based on entry nodes, wherein
an entry node is a node that has internet-accessibility;
merging the plurality of spanning trees based on a similarity score between the plurality of spanning trees; and
generating an application discovery graph annotation for
a node that has no edges, wherein the application
discovery graph annotation identifies the node as a
discovered application.

7. The system of claim 1, wherein the application discovery graph annotation identifies a previously unknown security posture relationship between a first entity and one or more of the following: a first application, a second application, a shared resource, or a service resource.

8. The system of claim 1, wherein the security posture visualization comprises an alert associated with the application discovery graph annotation, wherein the alert is associated with a prioritization identifier and a remediation action, wherein the prioritization identifier is based on the application discovery graph annotation and the remediation action is executable to address a security threat associated with the alert.

9. The system of claim 1, the operations further comprising:
communicating the request for the security posture of the
computing environment;
based on the request, receiving the security posture visualization associated with the computing environment,
wherein the security posture visualization comprises
the application discovery graph annotation that is associated with the application discovery graph and the
annotated application discovery graph; and
causing display of the security posture visualization comprising the application discovery graph annotation.

10. The system of claim 1, the operations further comprising:
receiving an indication to execute a remediation action
associated with the application discovery graph annotation, wherein the remediation action is associated
with the security posture visualization; and
communicating the indication to execute the remediation
action to cause execution of the remediation action.

11. One or more computer-storage media having computer-executable instructions embodied thereon that, when executed by a computing system having a processor and memory, cause the processor to perform operations, the operations comprising:
communicating a request for a security posture of a
computing environment;
based on the request, receiving a security posture visualization associated with the computing environment,
wherein the security posture visualization comprises an
application discovery graph annotation that is associated with an application discovery graph and an annotated application discovery graph,
wherein the annotated application discovery graph is
generated based on executing a plurality of application
discovery operations that annotate the application discovery graph with one or more application discovery
graph annotations based on analyzing one or more
spanning trees in the application discovery graph, wherein analyzing the plurality of spanning trees comprises comparing a first spanning tree to a second spanning tree and merging the first spanning tree to the second spanning tree based on similarities to support mapping of entities with shared resources or services between the first spanning tree and the second spanning tree; and causing display of the security posture visualization comprising an application discovery graph annotation.

12. The media of claim 11, wherein the security posture visualization comprises an alert associated with the application discovery graph annotation, wherein the alert is associated with a prioritization identifier and a remediation action, wherein the prioritization identifier is based on the application discovery graph annotation and the remediation action is executable to address a security threat associated with the alert.

13. The media of claim 11, the operations further comprising:

accessing application discovery data associated with a plurality of computing resources of a computing environment;

based on the application discovery data, generating the annotated application discovery graph comprising a plurality of entities representing the plurality of computing resources; and deploying the application discovery graph to support generating the security posture of the computing environment.

14. The media of claim 13, further comprising an application discovery engine that supports generating a plurality of application discovery graph annotations, wherein the application discovery annotation is security posture information of an entity in the annotated application discovery graph that is derived based on executing the application discovery operations on the application discovery graph.

15. The media of claim 11, the operations further comprising:

receiving an indication to execute a remediation action associated with application discovery graph annotation, wherein the remediation action is associated with the security posture visualization; and communicating the indication to execute the remediation action to cause execution of the remediation action.

16. A computer-implemented method, the method comprising:

accessing application discovery data associated with a plurality of computing resources of a computing environment;

based on the application discovery data, generating an annotated application discovery graph comprising a plurality of entities representing the plurality of computing resources, wherein generating the annotated application discovery graph comprises executing a plurality of application discovery operations that annotate the application discovery graph with one or more application discovery graph annotations based on analyzing one or more spanning trees in the application discovery graph, wherein analyzing the plurality of spanning trees comprises comparing a first spanning tree to a second spanning tree and merging the first spanning tree to the second spanning tree based on similarities to support mapping of entities with shared resources or services between the first spanning tree and the second spanning tree; and deploying the annotated application discovery graph to support generating a security posture of the computing environment.

17. The method of claim 16, further comprising:
using the application discovery graph, generating a plurality of spanning trees based on entry nodes, wherein an entry node is a node that has internet-accessibility;
merging the plurality of spanning trees based on a similarity score between the plurality of spanning trees; and
generating an application discovery graph annotation for a node that has no edges, wherein the application discovery graph annotation identifies the node as a discovered application.

18. The method of claim 16, wherein the application discovery graph annotation identifies a previously unknown security posture relationship between a first entity and one or more of the following: a first application, a second application, a shared resource, or a service resource.

19. The method of claim 16, wherein the application discovery graph comprises two or more of the following: a first set of entities associated with a first application, a second set of entities associated with a second application, a third set of entities identified as shared resources, and a fourth set of entities identified as service resources.

20. The method of claim 19, the method further comprising:

accessing the annotated application discovery graph;
based on the annotated application discovery graph, generating a security posture visualization; and
communicating the security posture visualization comprising an application discovery graph annotation.

* * * * *